United States Patent
Teoh et al.

(10) Patent No.: US 8,453,089 B2
(45) Date of Patent: May 28, 2013

(54) METHOD AND APPARATUS FOR PATTERN ADJUSTED TIMING VIA PATTERN MATCHING

(75) Inventors: Kah Ching Edward Teoh, Singapore (SG); Vito Dai, Santa Clara, CA (US)

(73) Assignee: Globalfoundries Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/251,437

(22) Filed: Oct. 3, 2011

(65) Prior Publication Data

US 2013/0086542 A1    Apr. 4, 2013

(51) Int. Cl.
 *G06F 17/50* (2006.01)
(52) U.S. Cl.
 USPC ........... 716/113; 716/111; 716/112; 716/115; 716/132; 716/139; 716/55
(58) Field of Classification Search
 USPC ................. 716/111, 112, 113, 115, 132, 139, 716/55
 See application file for complete search history.

(56) References Cited

U.S. PATENT DOCUMENTS

| | | | |
|---|---|---|---|
| 6,499,131 B1* | 12/2002 | Savithri et al. | 716/115 |
| 7,685,558 B2* | 3/2010 | Lai et al. | 716/51 |
| 7,941,776 B2* | 5/2011 | Majumder et al. | 716/122 |
| 8,037,575 B2* | 10/2011 | Cheng et al. | 16/54 |
| 8,056,022 B2* | 11/2011 | Robles et al. | 716/52 |
| 8,099,706 B2* | 1/2012 | Yamada | 716/139 |
| 2004/0025123 A1* | 2/2004 | Angilivelil | 716/4 |
| 2007/0143723 A1* | 6/2007 | Kawakami | 716/6 |
| 2009/0271749 A1* | 10/2009 | Tang et al. | 716/5 |
| 2010/0058263 A1* | 3/2010 | Tyminski et al. | 716/5 |
| 2012/0137263 A1* | 5/2012 | Dai et al. | 716/113 |
| 2012/0185807 A1* | 7/2012 | Tsai et al. | 716/52 |

* cited by examiner

*Primary Examiner* — Helen Rossoshek
(74) *Attorney, Agent, or Firm* — Ditthavong Mori & Steiner, P.C.

(57) ABSTRACT

An approach is provided for pattern adjusted timing via pattern matching. Embodiments include receiving data corresponding to a problematic layout pattern associated with at least one performance characteristic and data corresponding to an integrated circuit layout design, scanning the integrated circuit layout design for the problematic layout pattern, identifying at least one portion of the integrated circuit layout design substantially matching the problematic layout pattern, and modifying a netlist associated with the integrated circuit layout design, the modification being based on the at least one performance characteristic.

20 Claims, 20 Drawing Sheets

| SCHEMATIC PIN | MODEL PIN | CONNECTING PIN | TIMING REQUIREMENT | TIMING ANALYSIS RESULT | DESIGN VERIFICATION RESULT |
|---|---|---|---|---|---|
| 1 | U2/Z | U4/A | TR1 | TAR1 | OK |
| 2 | U1/Z | U2/A | TR2 | TAR2 | VIOLATION |
| 3 | U5/Z | U9/A | TR3 | TAR3 | OK |
| ... | ... | ... | ... | ... | ... |
| SPn | MPn | CPn | TRn | TARn | DVRn |

FIG. 14

METHOD AND APPARATUS FOR PATTERN ADJUSTED TIMING VIA PATTERN MATCHING

TECHNICAL FIELD

The present disclosure relates to technology for implementing electronic design automation tools, and in particular, to electronic design automation tools for pattern adjusted timing via pattern matching.

BACKGROUND

Manufacturability-aware physical integrated circuit (IC) design processes, which take into account such factors as yield and reliability, are becoming increasingly important aspects in bridging the gap between what is designed and what is actually produced or fabricated. This disconnect between design and production is often attributable to physical layout patterns (or configurations), also referred to herein as problematic layout patterns, being susceptible to various processing issues related to the manufacturing processes being employed. For instance, ICs are often fabricated using one or more deposition-based, modification-based (e.g., doping, implantation, etc.), patterning-based (e.g., lithography), removal-based (e.g., etching, planarization, etc.), and/or the like manufacturing steps, which are prone to various processing fluctuations, such as bridging, necking, notching, pinching, stressing, and the like, as well as other parametric design marginalities. Beyond affecting yield and reliability, these processing fluctuations also affect the electrical characteristics and, thereby, performance (e.g., timing yields, maximum operating frequencies, etc.) of the IC designs or, more specifically, the interconnects defined by (or within) the design. This is due, in part, to the dimensional variations (e.g., widening, narrowing, etc.) exhibited by at least some of the interconnects (or at least portions thereof) that result from the processing fluctuations. For instance, widening and/or narrowing of an interconnect can cause resistance, capacitance, and/or inductance (RCL) changes, which further effect the performance of the interconnect, such as its timing characteristic (e.g., RCL delay). It is, therefore, desirable to be able to identity, characterize, and remove these problematic layout patterns, as well as to replace them with more reliable, better performing, yield-friendly configurations.

Traditionally, however, design verification processes focusing on the electrical characteristics and, thereby, performance of an IC design have aggregated towards performing timing analysis on the logic design of the IC design in order to estimate one or more timing characteristics of the IC design, such as worst-case and best-case delays. As critical dimensions in the physical IC designs have rapidly scaled smaller and smaller, increased parametric variability of the IC designs has given rise to an increasing number of significant and independent sources of variation in the manufacture of the physical IC design. Consequently, this rise in potential sources of variation has lead to exponential complexity for traditional static timing analysis methodologies. One solution to this problem is path-based statistical timing analysis, in which the probability distribution of the performance of a chip is computed in a single analysis, simultaneously taking into account all possible sources of variation. Such probabilistic methods are often dependent upon restricting the sources of variation to smaller numbers, but conventional algorithms attempt to address the exponential complexity in the dimensionality of the process space. These design verification processes are very computationally intensive, requiring relatively large amounts of computing power and memory resources. Further, these processes are computationally intensive, not to mention, have relatively long "run-times." In competitive environments like the semiconductor industry, design cycles need to be as short as feasibly possible, and lengthy design verification processes only burden such efforts.

Furthermore, design verification must compensate for the physical effects of fabricating an IC design. This is because performance is dependent not only upon the logic design itself, but also upon the physical implementation, juxtaposition, and signal routing characteristics affecting performance. As such, feature-based RCL extraction becomes evermore critical, especially given the dimensional variations exhibited by at least some IC design features that result from processing fluctuations characteristic to manufacturing problematic layout patterns. Given the repeatability of these patterns, conventional design constraint definitions (whether extracted or simply designer-defined) stand to be greatly augmented by one or more multi-dimensional pattern matching techniques capable of quickly identifying problematic layout patterns and accounting for their electrical characteristic and, thereby, performance effects on timing closure determinations.

A need, therefore, exists for methodology that facilitates efficient design verification tools capable of identifying and accounting for the performance effects of problematic layout patterns in timing analysis determinations. There exists a particular need for methodology enabling the identification and accounting for problematic layout patterns via multi-dimensional pattern matching technology.

SUMMARY

An aspect of the present disclosure is a method for pattern adjusted timing via pattern matching.

Another aspect of the present disclosure is an apparatus for pattern adjusted timing via pattern matching.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: receiving, at least in part, data corresponding to a problematic layout pattern, the problematic layout pattern being associated with at least one performance characteristic; receiving, at least in part, data corresponding to an integrated circuit layout design; scanning the integrated circuit layout design for the problematic layout pattern; identifying at least one portion of the integrated circuit layout design substantially matching the problematic layout pattern; and modifying a netlist associated with the integrated circuit layout design based on the at least one performance characteristic.

Aspects of the present disclosure include: receiving, at least in part, data corresponding to one or more design constraints associated with the at least one portion of the integrated circuit layout design; executing a performance constraint analysis based on the modified netlist and the one or more design constraints; and generating a timing closure associated with the at least one portion of the integrated circuit layout design based on the performance constraint analysis. Another aspect includes: extracting one or more parasitic values associated with the at least one portion of the integrated circuit layout design; and storing the one or more parasitic values as the one or more design constraints. Other aspects include the one or more design constraints being specified by at least one designer of the integrated circuit layout design.

Additional aspects include: receiving, at least in part, data corresponding to one or more design constraints associated with the integrated circuit layout design; executing a first performance constraint analysis based on the one or more design constraints; generating a first timing closure associated with at least one feature of the integrated circuit layout design based on the performance constraint analysis; and determining that the first timing closure violates at least one design rule, wherein scanning the integrated circuit layout design for the problematic layout pattern is limited to the at least one feature of the integrated circuit layout design, and the at least one feature includes the at least one portion. Further aspects include: executing a second performance constraint analysis based on the modified netlist and the one or more design constraints; and generating a second timing closure associated with the at least one feature of the integrated circuit layout design based on the second performance constraint analysis. Other aspects include the at least one performance characteristic including a timing delay. Another aspect includes the timing delay relating to either a setup time delay, a hold time delay, or an aggregated delay combining one or more setup time delays with one or more hold time delays.

Another aspect of the present disclosure is an apparatus including: at least one processor; and at least one memory including computer program code, the at least one memory and the computer program code configured to, with the at least one processor, cause the apparatus to perform at least the following, receive data corresponding to a problematic layout pattern associated with at least one performance characteristic, receive data corresponding to an integrated circuit layout design, scan the integrated circuit layout design for the problematic layout pattern, scan the integrated circuit layout design for the problematic layout pattern, identify at least one portion of the integrated circuit layout design substantially matching the problematic layout pattern, and modify a netlist associated with the integrated circuit layout design based on the at least one performance characteristic.

Aspects of the present disclosure include the apparatus being at least further caused to: receive data corresponding to one or more design constraints associated with the at least one portion of the integrated circuit layout design; execute a performance constraint analysis based on the modified netlist and the one or more design constraints; and generate a timing closure associated with the at least one portion of the integrated circuit layout design based on the performance constraint analysis. Another aspect includes the apparatus being at least further caused to: extract one or more parasitic values associated with the at least one portion of the integrated circuit layout design; and store the one or more parasitic values as the one or more design constraints. Other aspects include the one or more design constraints being specified by at least one designer of the integrated circuit layout design. Additional aspects include the apparatus being at least further caused to: receive data corresponding to one or more design constraints associated with the integrated circuit layout design; execute a first performance constraint analysis based on the one or more design constraints; generate a first timing closure associated with at least one feature of the integrated circuit layout design based on the performance constraint analysis; and determine that the first timing closure violates at least one design rule, wherein scanning the integrated circuit layout design for the problematic layout pattern is limited to the at least one feature of the integrated circuit layout design, and the at least one feature includes the at least one portion. Further aspects include the apparatus being at least further caused to: execute a second performance constraint analysis based on the modified netlist and the one or more design constraints; and generate a second timing closure associated with the at least one feature of the integrated circuit layout design based on the performance constraint analysis. Other aspects include the at least one performance characteristic including a timing delay. Another aspect includes the timing delay relating to either a setup time delay, a hold time delay, or an aggregated delay combining one or more setup time delays with one or more hold time delays.

Another aspect of the present disclosure is a method including: receiving, at least in part, data corresponding to a problematic layout pattern associated with at least one performance characteristic, the problematic layout pattern being further associated with at least one manufacturing process; receiving, at least in part, data corresponding to an integrated circuit layout design; scanning the integrated circuit layout design for the problematic layout pattern; identifying at least one portion of the integrated circuit layout design substantially matching the problematic layout pattern; and modifying a netlist associated with the integrated circuit layout design based on the at least one performance characteristic, wherein the at least one performance characteristic relates to either a setup time delay, a hold time delay, or an aggregated delay combining one or more setup time delays with one or more hold time delays.

Aspects of the present disclosure include: receiving, at least in part, data corresponding to one or more design constraints associated with the at least one portion of the integrated circuit layout design; executing a performance constraint analysis based on the modified netlist and the one or more design constraints; and generating a timing closure associated with the at least one portion of the integrated circuit layout design based on the performance constraint analysis, wherein the one or more design constraints are either specified by at least one designer of the integrated circuit layout design or are extracted parasitic values associated with the at least one portion of the integrated circuit layout design. Another aspect includes: receiving, at least in part, data corresponding to one or more design constraints associated with the integrated circuit layout design; executing a first performance constraint analysis based on the one or more design constraints; generating a first timing closure associated with at least one feature (such as a timing path) of the integrated circuit layout design based on the performance constraint analysis; and determining that the first timing closure violates at least one design rule, wherein scanning the integrated circuit layout design for the problematic layout pattern is limited to the at least one feature of the integrated circuit layout design, and the at least one feature includes the at least one portion. Other aspects include: executing a second performance constraint analysis based on the modified netlist and the one or more design constraints; and generating a second timing closure associated with the at least one feature of the integrated circuit layout design based on the performance constraint analysis.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 14 schematically illustrates timing analysis and design verification results, according to an exemplary embodiment;

DETAILED DESCRIPTION

Figure 1:
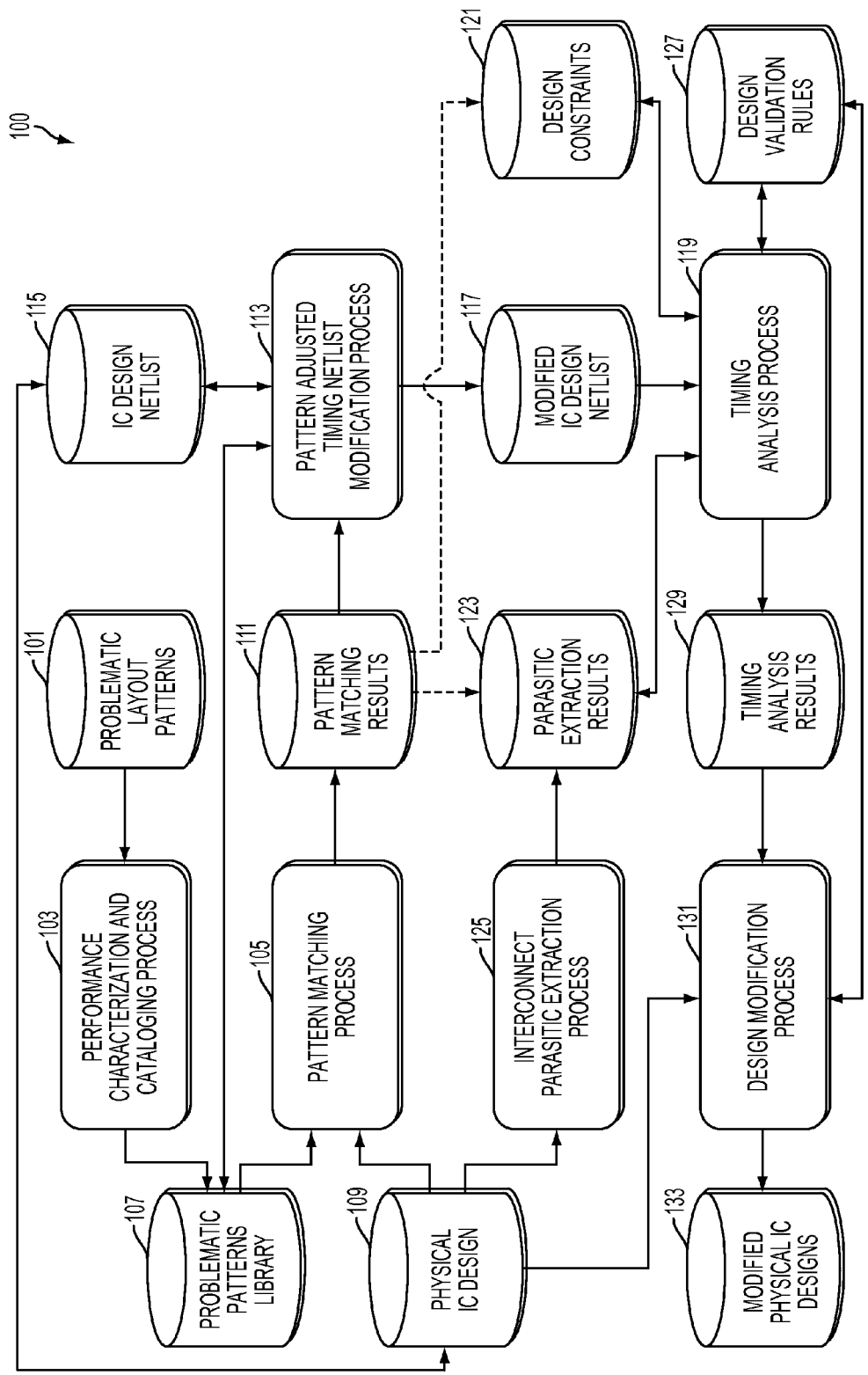
FIG. 1 schematically illustrates an overall process flow for pattern adjusted timing via pattern matching, according to an exemplary embodiment.

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves a problem of increasing time and resources spent estimating and validating the performance characteristics (e.g., timing yields, maximum operating frequencies, etc.) of IC designs and, if necessary, modifying the IC designs in order to increase yield, reliability, and/or performance metrics. In accordance with embodiments of the present disclosure, the electrical properties and, thereby, performance variations associated with manufacturing various problematic layout patterns via one or more fabrication techniques are identified, cataloged, and utilized in conjunction with one or more design constraints to increase the accuracy of timing determinations and design validation processes associated with later arising IC designs. Additional embodiments of the present disclosure enable cataloged problematic layout patterns to be identified in later arising IC designs via efficient pattern matching technology. Performance characteristics associated with identified problematic layout patterns may be utilized to modify (or adjust) netlist information associated with the physical attributes (e.g., interconnects, etc.) of the later arising IC designs. Other aspects of the present disclosure enable the modified netlist information to be utilized in conjunction with one or more design constraints, whether designer specified or extracted, to more accurately perform timing analysis determinations, such as static timing analysis (STA), statistical STA (SSTA), etc., determinations. According to other embodiments, performance characteristics associated with identified problematic layout patterns maybe be utilized to modify one or more design constraints, whether designer specified or extracted, with or without being further utilized to modify the netlist information. The results of these determinations may be validated and, if necessary, utilized to modify (or optimize) one or more aspects of the later arising IC designs to increase their yield, reliability, and/or performance metrics.

Methodology in accordance with embodiments of the present disclosure, includes: receiving, at least in part, data corresponding to a problematic layout pattern, the problematic layout pattern being associated with at least one performance characteristic, receiving, at least in part, data corresponding to an integrated circuit layout design, scanning the integrated circuit layout design for the problematic layout pattern, identifying at least one portion of the integrated circuit layout design substantially matching the problematic layout pattern, and modifying a netlist associated with the integrated circuit layout design based on the at least one performance characteristic.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

FIG. 1 schematically illustrates an overall process flow for pattern adjusted timing via pattern matching, according to an exemplary embodiment. Process flow 100 may be associated with at least one manufacturing process and, thereby, at least one IC manufacturer. In this manner, the IC manufacturer (or foundry) may provide an IC designer with one or more problematic layout patterns, which may be stored to, for example, problematic layout patterns repository 101. As previously described, these problematic layout patterns result in at least one manufactured variation (or hotspot) when fabricated via the at least one manufacturing process, such as at least one deposition-based, modification-based, patterning-based, removal-based, etc., manufacturing process. The IC manufacturer may provide the problematic layout patterns as part of a manual, as user interface input, and/or as foundry output from one or more design verification tools. In this manner, the problematic layout patterns may be further associated with one or more design verification rules, such as one more parameters (or constraints) governing geometric element area, grid, length, size, spacing, corner, enclosure, intersection, overlap, and/or the like. It is also noted that the problematic layout patterns may be manufacturer and/or manufacturing process specific and, therefore, problematic layout patterns may be stored to repository 101 in association with corresponding manufacturers and/or manufacturing processes. An exemplary problematic layout pattern is described in more detail in association with FIGS. 2 and 3.

Figure 2:
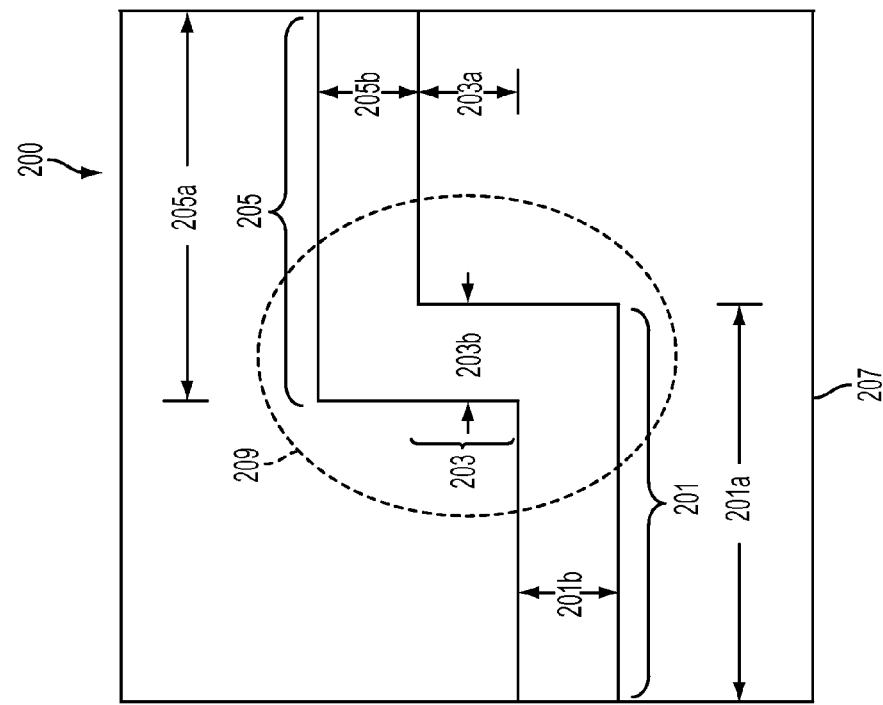
FIG. 2 schematically illustrates an exemplary problematic layout pattern, according to an exemplary embodiment.

FIG. 2 schematically illustrates an exemplary problematic layout pattern, according to an exemplary embodiment. The purpose of FIG. 2 is merely to convey one possible problematic layout pattern. It is contemplated that problematic layout patterns may be alternatively configured and may, when manufactured, result in additional and/or alternative manufactured variations, e.g., at least one fabricated geometric element exhibiting yield, reliability, and/or electrical performance detracting features, such as bridging, necking, notching, pinching, line-end shorting, stressing, and/or the like features. As shown, problematic layout pattern 200 includes one or more geometric elements (or features), such as geometric elements 201, 203, and 205, within boundary 207 that together form, for instance, a portion of an interconnect of a physical IC design. Geometric elements 201 through 205 may be associated with one or more physical attributes, such as corresponding lengths 201a through 205a, widths 201b through 205b, etc. When manufactured, pattern 200 may result in manufactured variability issues within (or around) region 209. The physical attributes and/or spatial configuration of geometric elements 201 through 205 may not exhibit conventional design verification rule violations, but may still cause, at least in part, manufactured variability issues due to, for example, a "proximity effect," which arises from a particular spatial configuration of geometric elements (or portions thereof) in a vicinity of region 209. It is further noted that the proximity effect may result, at least in part, from an aggregation of individual manufacturing process-related effects, such as lithography-related effects, mechanical stress-related effects, etc., when constituent geometric elements 201 through 205 of pattern 200 are fabricated. For instance, one or more physical attributes, and contours associated thereby, of geometric elements 201 through 205 may, when manufactured, be sufficiently altered from their designed counterparts to raise doubts concerning one or more yield, reliability, and/or electrical performance characteristics of the manufactured design/features. Proximity-based effects may be better understood in association with FIG. 3.

Figure 3:
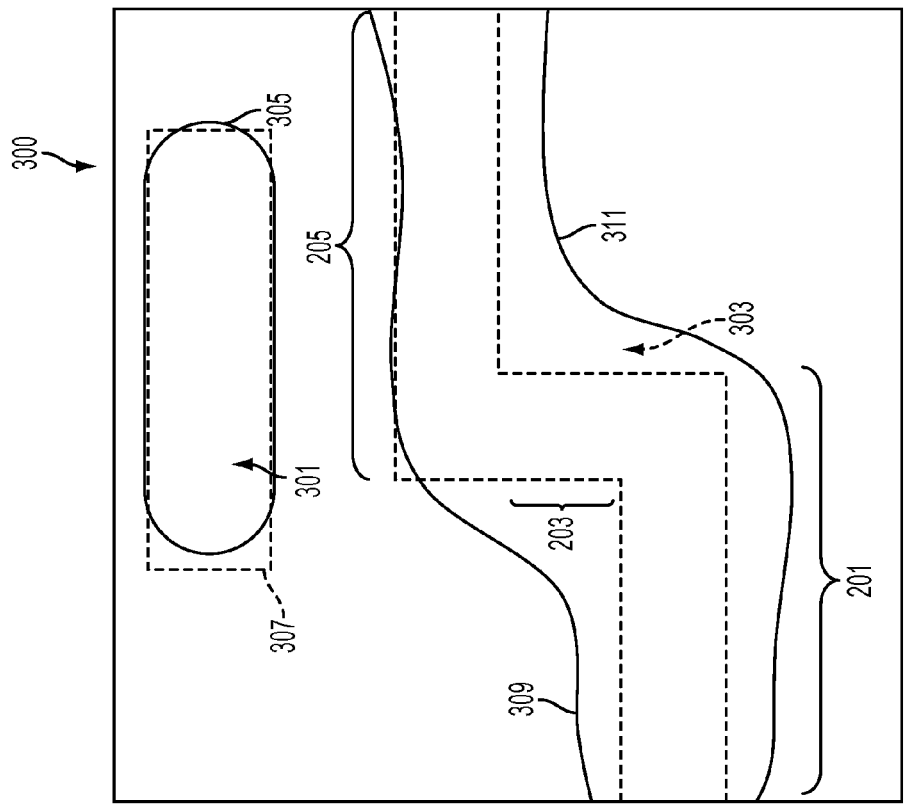
FIG. 3 schematically illustrates a portion of an integrated circuit design including a fabricated version of the exemplary problematic layout pattern of FIG. 2, according to an exemplary embodiment.

FIG. 3 schematically illustrates a portion of an integrated circuit design including a fabricated version of the exemplary problematic layout pattern of FIG. 2, according to an exemplary embodiment. As shown, the illustrated portion of IC design 300 includes fabricated interconnect portions 301 and 303. Interconnect portion 301 includes bounding edge 305, which for all practical intensive purposes sufficiently matches intended design feature 307. Due to one or more proximity effects, the fabrication of geometric elements 201 through 205 via, for instance, one or more patterning-based manufacturing techniques, has resulted in interconnect portion 303 being fabricated with bounding edges 309 and 311 that do not sufficiently match intended design features 201 through 205 having (or characterized by), for instance, physical attributes 201a through 205a, 201b through 205b, etc. The fabrication of interconnect portion 303 may pass conventional physical design verification rules. However, because of the sufficiently altered physical characteristics of the fabricated feature, one or more electrical properties of interconnect portion 303 may be affected. Given the increasing stringency of modern IC design performance, such fabricated features and, thereby, their altered electrical characteristics provide reason to question whether the aggregated performance of an interconnect including, for example, fabricated interconnect portion 303 would pass electrical design verification. For instance, the sufficiently altered physical characteristics of interconnect portion 303 may, in turn, sufficiently affect the resistance, capacitance, and/or inductance of the fabricated feature, which may cause, for example, a localized timing delay. The effects of the localized timing delay may cause, at least in part, an aggregated timing delay (or violation) in an interconnect (and/or other features) including fabricated interconnect portion 303, such as a hold time or setup time delay.

Traditional timing analysis and electrical design validation determinations, however, may simply estimate the electrical characteristics and, thereby, performance of fabricated problematic layout pattern 200 based on the intended (or designed) physical characteristics of geometric elements 201 through 205, such as based on physical attributes 201a through 205a, 201b through 205b, etc. As such, a designed interconnect including problematic layout pattern 200 may pass initial electrical design validation during design stages, but the fabricated interconnect including interconnect portion 303 may subsequently fail post-fabrication review due to, for instance, the disparity between bounding edges 309 and 311 and corresponding contours associated with geometric elements 201 through 205. Attempts have been made to capture the effects of such discrepancies between the physical characteristics of fabricated features and their designed counterparts via, for instance, parasitic extraction processes carried out on simulated contours of designed features. These processes, however, are unduly burdensome and rather computationally intensive. They often require highly-accurate, complex manufacturability models that demand relatively large amounts of computing power and resources, not to mention, relatively long "run-times." Furthermore, these complex manufacturability models might not be available during design stages of the IC process.

Embodiments of the present disclosure, however, capture, during early stages of the IC design flow, the effects of manufacturing variations on the attributes (or characteristics) of the physical IC design itself. Physical IC designs are distinct from those traditionally used in design automation for process simulation, as the study and analysis of physical IC designs must be several orders of magnitude faster and, yet, at least as accurate. Accordingly, the discrepancies between the physical characteristics of fabricated features and their designed counterparts may, in various exemplary embodiments, be cataloged in one or more libraries in association with one or more effects of such discrepancies upon the electrical and/or other performance variations. This information may be further stored in association with the manufacturing processes responsible for such discrepancies. In various embodiments, these libraries may be utilized in conjunction with one or more multi-dimensional pattern matching techniques to quickly identify problematic layout patterns and account for the effects of such problematic layout patterns during timing analysis and/or design validation determinations. According to other embodiments, these libraries may be utilized in conjunction with one or more multi-dimensional pattern matching techniques to quickly identify problematic layout patterns and account for the effects of such problematic layout patterns to modify (or adjust) one or more design constraints, which may be designer specified or extracted, as explained in more detail below.

Returning to FIG. 1, overall process flow 100 includes performance characterization and cataloging process 103 configured to determine one or more electrical characteristics and/or performance metric variations associated with the discrepancies between the physical characteristics of the fabricated features of various problematic layout patterns and their designed counterparts. Determined variations may be utilized in conjunction with associated problematic layout patterns to generate corresponding problematic layout pattern library entries that may be applied against later arising physical IC designs to quickly and efficiently identify and account for such problematic layout patterns within the physical IC designs, as will become more apparent below. The sensitivity of detection techniques, such as utilized in association with one or more multi-dimensional pattern matching processes (e.g., pattern matching process 105) may be based on at least one sensitivity parameter, which may be further utilized to determine and create other (or consolidated) problematic layout patterns. For instance, one or more problematic layout patterns may be determined to correspond in whole or in part to one or more portions of identified problematic layout patterns as those patterns are received (or retrieved) from repository 101 based on one or more sensitivity parameters. One or more other sensitivity parameters may be utilized to control the relationship between the spatial configuration of such or other portions.

Accordingly, process 103 may receive (or retrieve) problematic layout patterns and, in certain embodiments, other information stored in association with the problematic layout patterns from repository 101. Received problematic layout patterns and their fabricated (or simulated) counterparts (or information related thereto) may be converted into image-based mathematical presentations (or representations) that may be manipulated and analyzed in association with process 103 to determine and create other problematic layout patterns, such as described in association with FIGS. 4A through 5. Further, these and/or other image-based mathematical presentations may be utilized by process 103 to determine electrical characteristic and/or performance metric variations associated with the discrepancies between the physical characteristics of the fabricated features of any given problematic layout pattern and its designed counterpart, such as described in association with FIG. 6. Further, the problematic layout patterns and their corresponding electric characteristic and/or performance metric variations may be utilized to generate problematic layout pattern library entries, which may also be employed to control detection sensitivity of one or more pattern matching processes, such as described in association with FIG. 7.

Figure 4A:
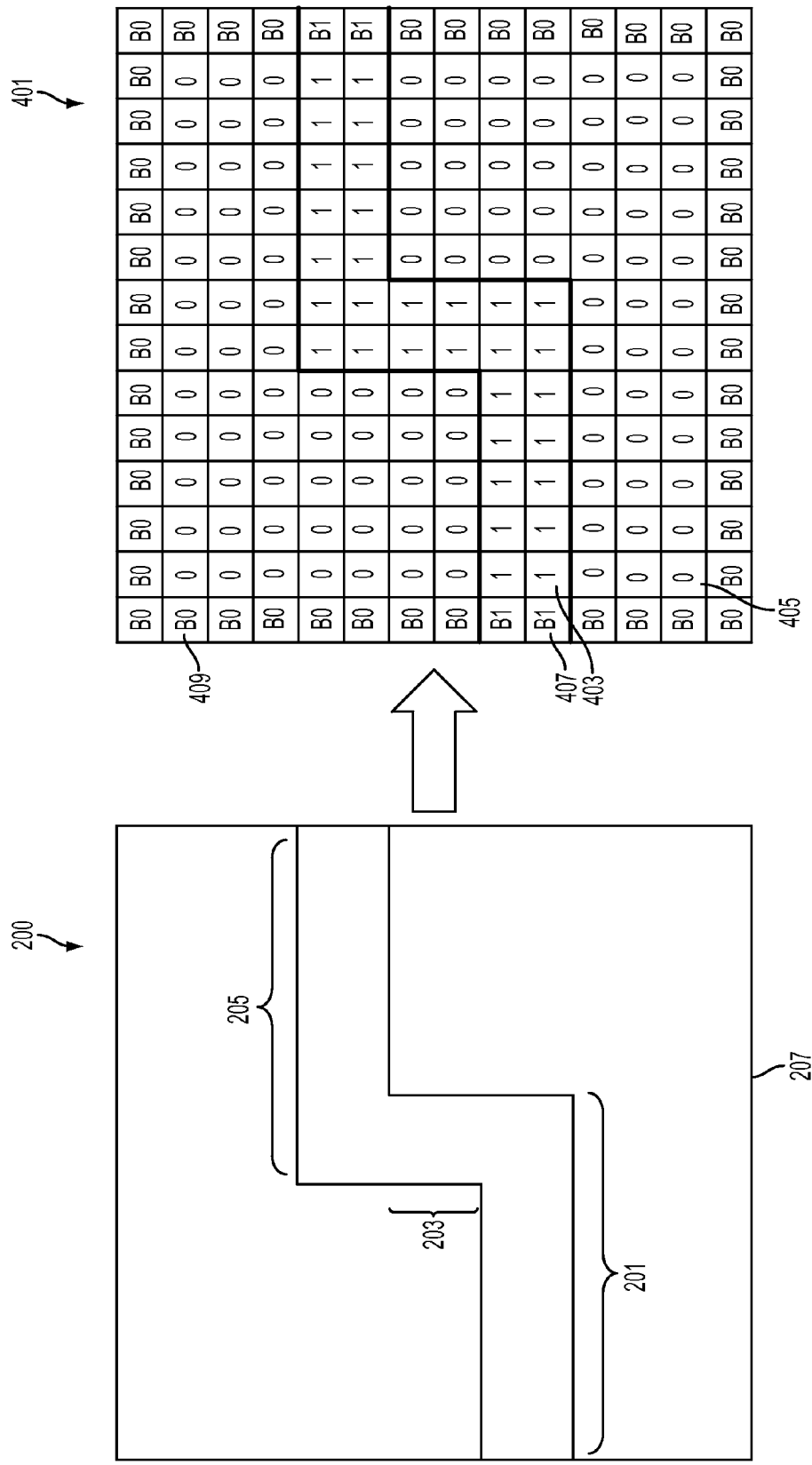
FIG. 4A schematically illustrates an imaged-based representation of a problematic layout pattern, according to an exemplary embodiment.

FIG. 4A schematically illustrates an imaged-based representation of a problematic layout pattern, according to an exemplary embodiment. Utilizing problematic layout pattern 200 of FIG. 2 as an example, pattern 200 including constituent geometric elements 201 through 205 may be pixilated (or digitized) as a pixilated matrix with each pixel of the matrix being represented as a vector defined by, for example, a 1 or 0. As seen in FIG. 4A, the granularity (or resolution) of the matrix is quite course for illustrative purposes and, as such, it is contemplated that any suitable granularity may be utilized for capturing and accounting for the subtleties of physical IC designs. In certain embodiments, one or more additional indicators may be utilized and/or appended to vector values to convey boundary pixels. For instance, pattern 200 may be represented as pixilated matrix 401 including a plurality of vector defined pixels, such as vector-defined pixels 403 through 409. In this manner, vector-defined pixels like pixel 403 may relate to portions of the problematic layout pattern corresponding to at least a portion of a constituent geometric element, whereas vector-defined pixels like pixel 405 may relate to portions of the problematic layout pattern not corresponding to at least a portion of a constituent geometric element. Vector-defined pixels 407 and 409 may be utilized in conjunction with one or more other vector defined pixels to convey boundary 207 of pattern 200. As such, vector-defined pixels like pixel 407 may relate to portions of the problematic layout pattern where at least a portion of a constituent geometric element defines a portion of boundary 207, whereas vector-defined pixels like pixel 409 may relate to boundary portions not being defined by at least a portion of a constituent geometric element. This exemplary pixel-based representation is straightforward and easily manipulated to determine and create other (or consolidated) problematic layout patterns, as well as to determine one or more electrical characteristics and/or performance metric variations associated with the discrepancies between designed features and their fabricated counterparts.

Figure 4B:
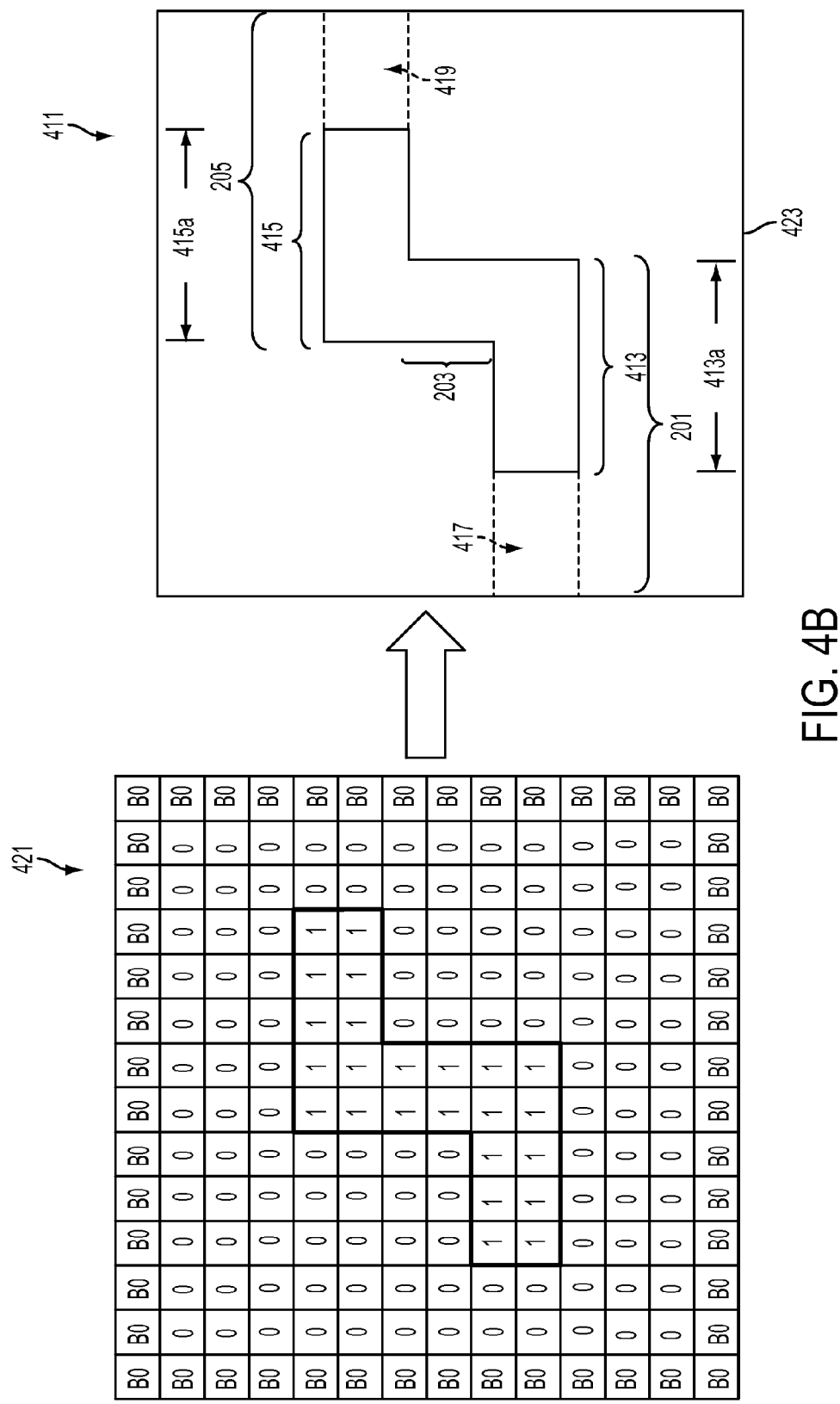
FIG. 4B schematically illustrates the manipulation of an imaged-based representation of a problematic layout pattern to create another problematic layout pattern, according to an exemplary embodiment.

FIG. 4B schematically illustrates the manipulation of an imaged-based representation of a problematic layout pattern to create another problematic layout pattern, according to an exemplary embodiment. In this example, problematic layout pattern 411 may have been determined and/or created to include constituent geometric element 203 based on at least one sensitivity parameter, and portions 413 and 415 of constituent geometric elements 201 and 205 based on the at least one sensitivity parameter and/or other sensitivity parameters. As such, one or more vector-defined pixels relating to portions 417 and 419 of constituent geometric elements 201 and 205 may be manipulated from first vector values to second vector values in order to remove portions 417 and 419 from corresponding geometric elements 201 and 205, such as illustrated via image-based mathematical representation 421. Accordingly, pixilated matrix 421 may be utilized to define and/or create problematic layout pattern 411, which includes constituent geometric elements 203, 413, and 415, which are bounded via boundary 423. As shown, constituent geometric elements 413 and 415 include corresponding modified lengths 413a and 415a; however, any design parameter, physical attribute, and/or spatial relationship of constituent geometric elements is contemplated. As will become more apparent below, detection sensitivity of pattern matching process 105 may be controlled based on the use of one or more sensitivity parameters and/or one or more problematic layout patterns.

Figure 5:
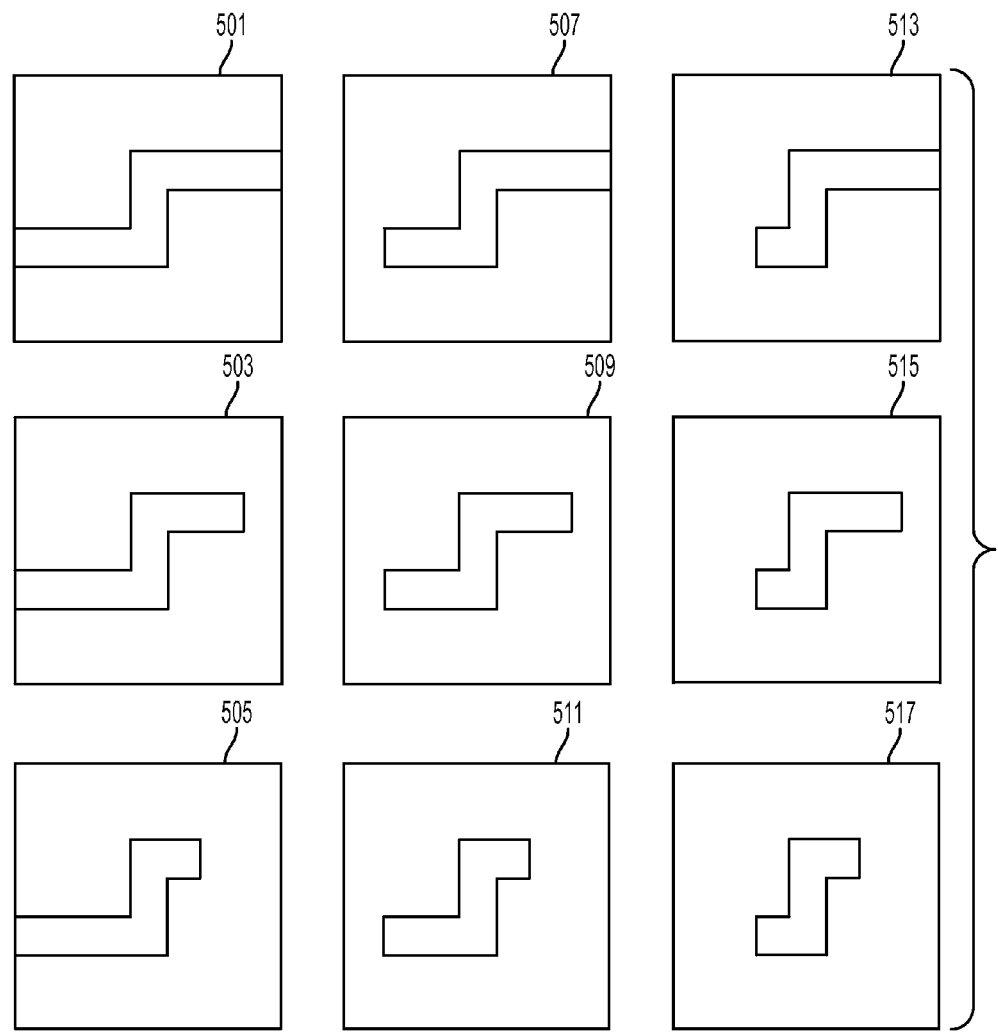
FIG. 5 schematically illustrates various problematic layout patterns generated in association with manipulating at least one detection sensitivity parameter, according to an exemplary embodiment.

In this manner, problematic layout patterns may be determined and/or created based on one or more sensitivity parameters configured to control how much of a problematic layout pattern must be present in a physical IC design to trigger a match (or substantial match) between the problematic layout pattern and at least a portion of the physical IC design. One or more other sensitivity parameters may be utilized to control the relationship between the spatial configuration of constituent geometric elements of problematic layout patterns. FIG. 5 schematically illustrates various problematic layout patterns generated in association with manipulating at least one detection sensitivity parameter, according to an exemplary embodiment. As shown, adjusting one or more detection sensitivity parameters may be utilized in association with, for instance, problematic layout pattern 200 to create one or more of problematic layout patterns 501 through 517, which are merely illustrative. Other and/or additional problematic layout patterns are contemplated.

Figure 6:
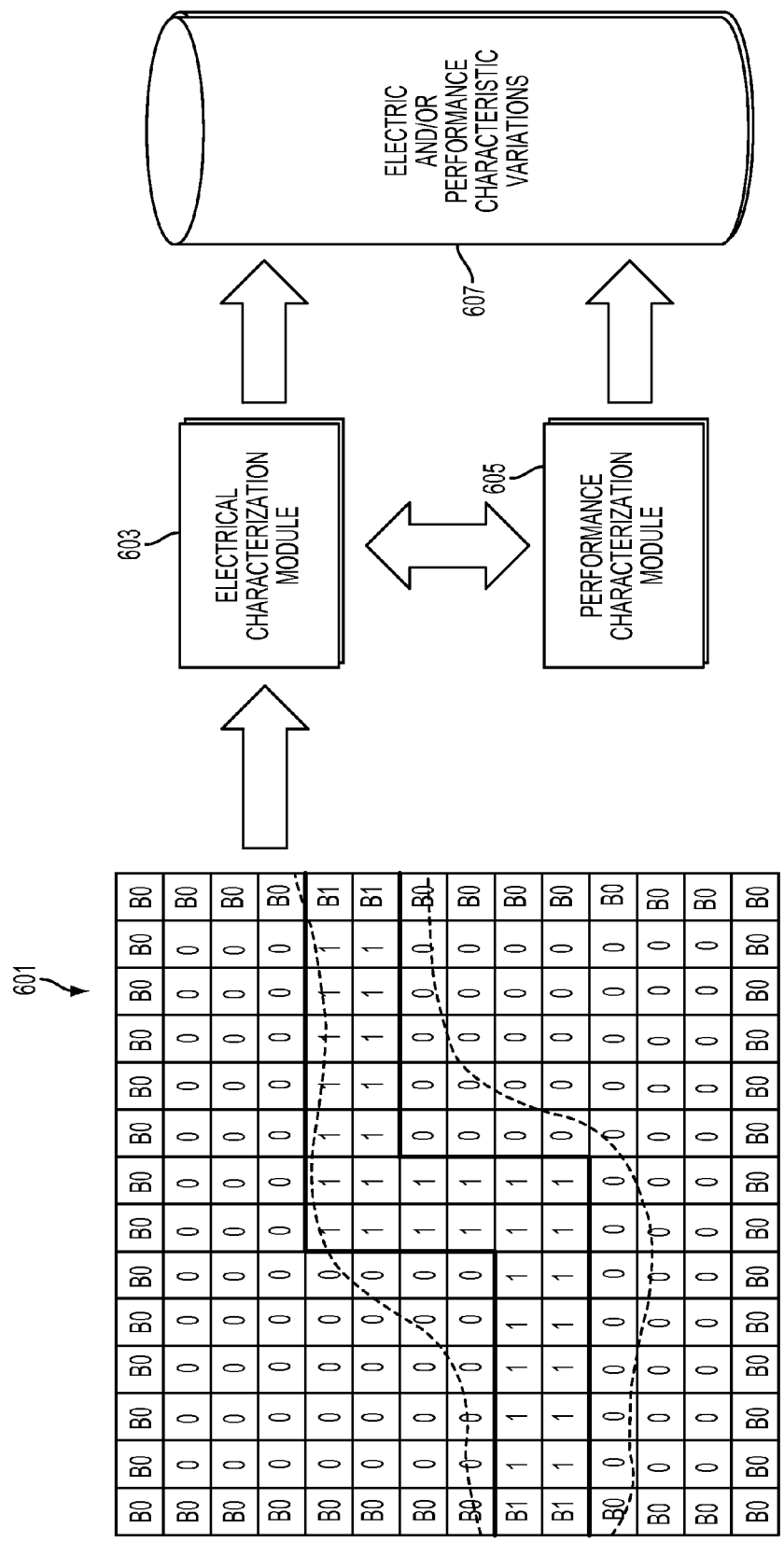
FIG. 6 schematically illustrates the use of image-based representations to analyze electrical characteristic and/or performance metric variations associated with fabricating problematic layout patterns, according to an exemplary embodiment.

FIG. 6 schematically illustrates the use of image-based representations to analyze electrical characteristic and/or performance metric variations associated with fabricating problematic layout patterns, according to an exemplary embodiment. For illustrative purposes, FIG. 6 is described in association with analyzing the electrical characteristic and/or performance metric variations associated with problematic layout pattern 200 and its fabricated counterpart, interconnect portion 303. According to one embodiment, image-based representation 401 may be overlaid (or combined) with at least one contour representing fabricated interconnect portion 303 to create image-based representation 601, which in turn may be analyzed for one or more process induced variations. For instance, electrical characterization module 603 may be utilized to estimate one or more electrical properties (e.g., one or more resistances, capacitances, inductances, etc.) and/or differences between such properties of problematic layout pattern 200 and fabricated interconnect portion 303. This information may be stored to, for example, repository 607 or any other suitable memory or storage location. The information may be further utilized by performance characterization module 605 to estimate one or more performance characteristics (e.g., leakage powers, timing delays, operating frequencies, etc.) and/or differences between such characteristics of problematic layout pattern 200 and fabricated interconnection portion 303. This information may also be stored to, for instance, repository 607 or any other suitable memory or storage location. As will become more apparent below, information stored to repository 607 may be utilized to generate one or more problematic layout pattern library entries configured to facilitate quick and efficient identification and accounting for corresponding problematic layout patterns within later arising physical IC designs.

Adverting back to FIG. 1, performance characterization and cataloging process 103 may be configured to consolidate (or cluster) problematic layout patterns stored to repository 101 or generated therefrom. For instance, sufficiently similar problematic layout patterns may be consolidated to reduce the number of patterns utilized to determine and/or create other problematic layout patterns. As another example, sufficiently similar problematic layout patterns may be consolidated to reduce the number of patterns utilized to generate problematic layout pattern library entries. In other instances, sufficiently similar problematic layout patterns may be consolidated to reduce the number of patterns searched for during pattern matching process 105. As such, problematic layout patterns may be hierarchically clustered, incrementally clustered, and/or otherwise clustered to achieve consolidation purposes.

Accordingly, process 103 may generate one or more problematic layout pattern library entries based on one or more problematic layout patterns and, in certain embodiments, other information stored to repository 101 or any other suitable memory or storage location. Generated library entries may be stored to, for instance, problematic patterns library repository 107, which may be periodically updated to account for variant manufacturing processes and/or advancements in technology nodes. It is also noted that repository 107 may be embedded as part of one or more electronic design automation (EDA) tools, such as one or more design verification plus tools. An illustrative problematic layout pattern library entry is explained in more detail in conjunction with FIG. 7. An exemplary process for generating one or more problematic layout pattern library entries is more fully described with FIG. 8.

Figure 7:
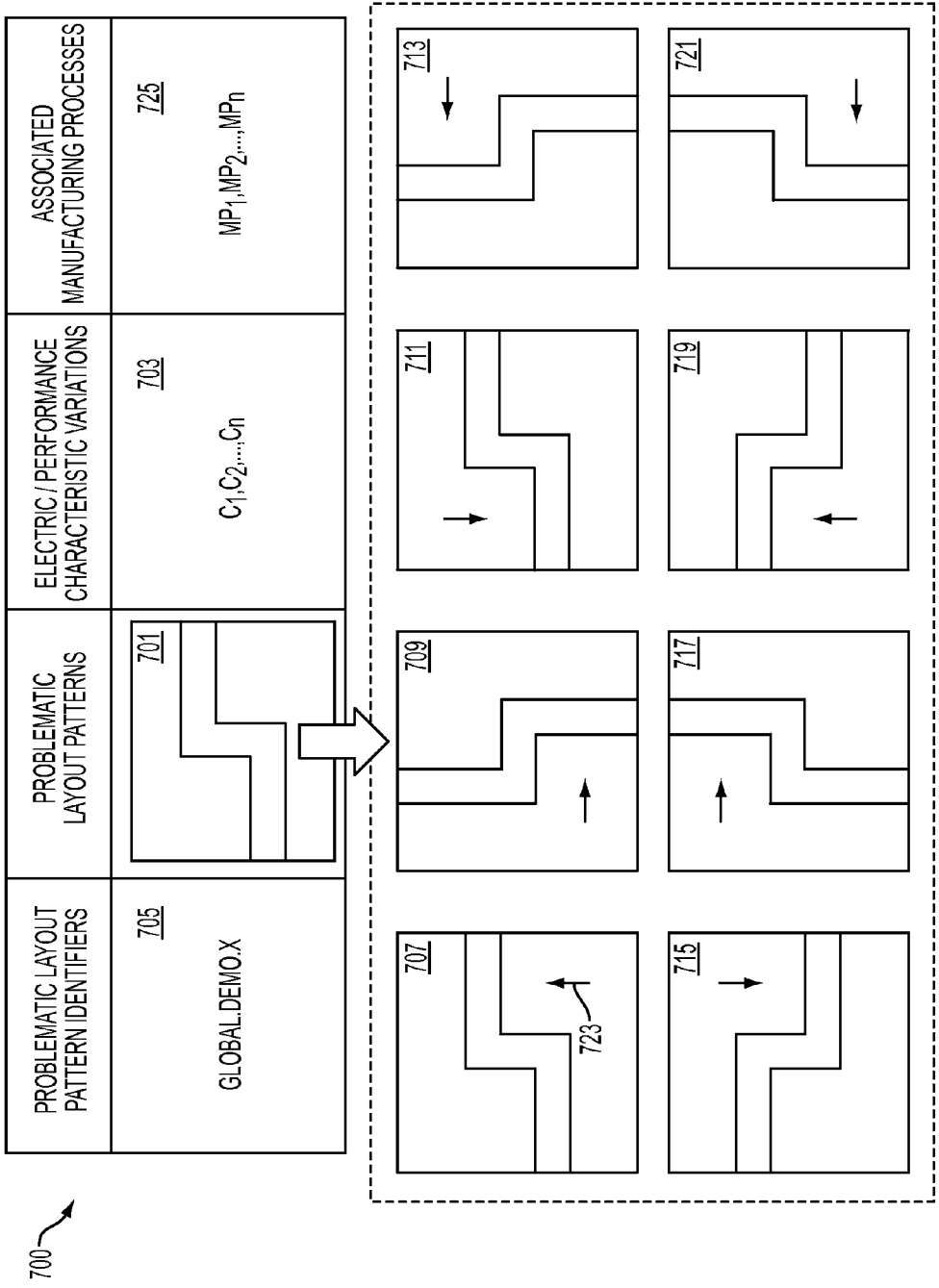
FIG. 7 schematically illustrates in table form a problematic layout pattern library entry, according to an exemplary embodiment.

FIG. 7 schematically illustrates in table form a problematic layout pattern library entry, according to an exemplary embodiment. The purpose of FIG. 7 is merely to convey one possible problematic layout pattern library entry and, as such, it is contemplated that other library entries may be generated and/or alternatively configured for application against later arising physical IC designs, as will become more apparent below. As shown, exemplary problematic layout pattern library entry 700 combines at least one problematic layout pattern 701 with one or more electrical characteristic and/or performance metric variations 703 associated therewith. The resulting combination may be identified and/or retrieved based on problematic layout pattern identifier 705. According to various embodiments, library entry 700 may also associate problematic layout patterns, such as problematic layout pattern 701, with one or more sensitivity parameters (not shown) and/or one or more other problematic layout patterns, such as problematic layout patterns 707 through 721. Problematic layout patterns 707 through 721 represent eight transformations of problematic layout pattern 701. Namely, problematic layout patterns 707 through 713 are four rotations (e.g., 0°, 90°, 180°, and 270° rotations) of problematic layout pattern 701. Further, problematic layout patterns 715 through 721 are four rotations (e.g., 0°, 90°, 180°, and 270° rotations) of a reflection of problematic layout pattern 701. For illustrative purposes, assist feature 723 has been included within problematic layout patterns 715 through 721 to aid in visualizing the various rotations and/or transformations of problematic layout pattern 701. Other problematic layout patterns may be provided, such as one or more other rotations and/or reflections of problematic layout pattern 701. Additionally or alternatively, these or other problematic layout patterns may correspond to respective rotations and/or transformations of one or more of problematic layout patterns 501 through 517 and/ or any other problematic layout pattern determined based on one or more sensitivity parameters. Problematic layout pattern 701 may be further stored in relationship with one or more manufacturing processes 725 associated therewith.

Figure 8:
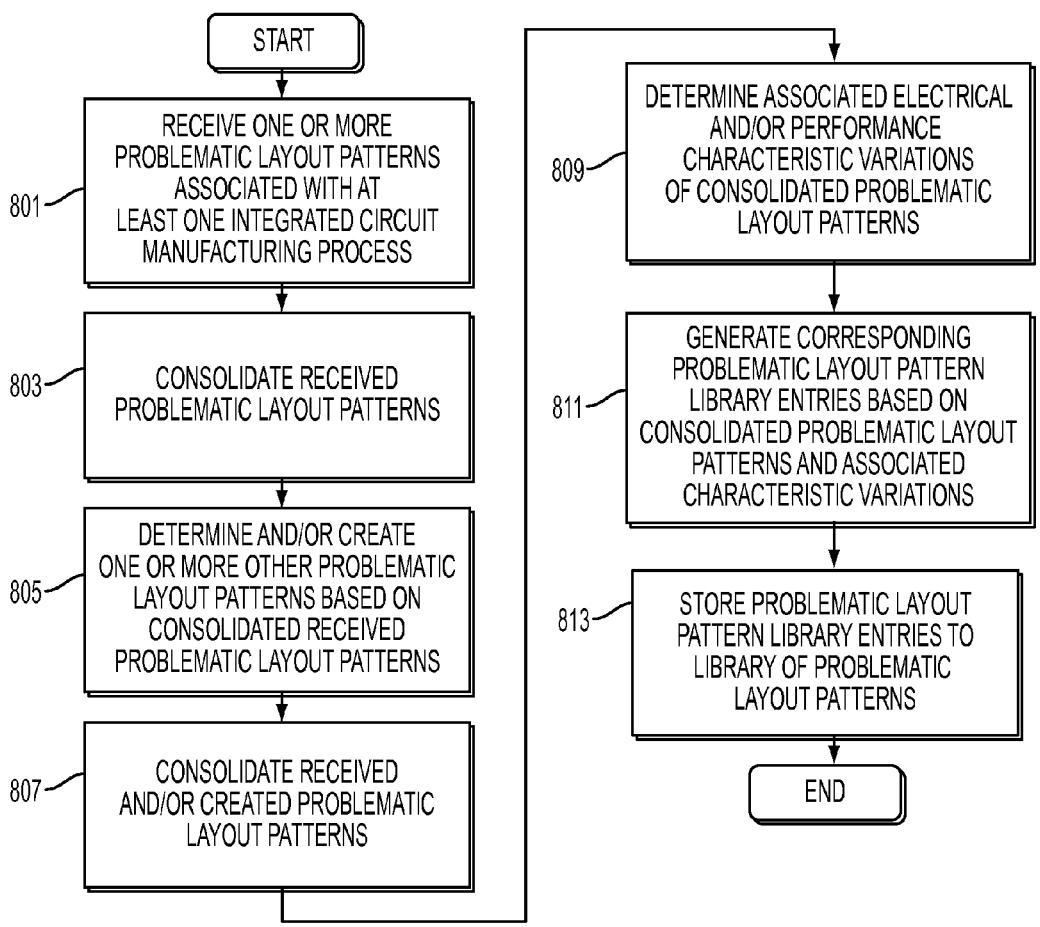
FIG. 8 is a flowchart of a process for creating one or more problematic layout pattern library entries, according to an exemplary embodiment.

FIG. 8 is a flowchart of a process for creating one or more problematic layout pattern library entries, according to an exemplary embodiment. For illustrative purposes, the process is described with reference to FIGS. 1 and 7. Further, the steps of the process may be performed in any suitable order, as well as combined or separated in any suitable manner. At step 801, one or more problematic layout patterns associated with one or more particular manufacturing processes are received (or retrieved) by, for example, performance characterization and cataloging process 103 from, for instance, problematic layout patterns repository 101. Additionally, other information stored to repository 101 may be received by process 103. Process 103 may consolidate received problematic layout patterns utilizing one or more of the aforementioned consolidation techniques, per step 803. In step 805, process 103 determines and/or creates one or more other problematic layout patterns based on consolidated received problematic layout patterns. For example, process 103 may determine and/or create problematic layout patterns 707 through 721 based on problematic layout pattern 701. As previously described, this process may be based on one or more sensitivity parameters.

Accordingly, process 103 may consolidate received and/or created problematic layout patterns, per step 807, in a similar fashion to step 803. In step 809, one or more associated electrical and/or performance characteristic variations may be determined based on consolidated problematic layout patterns (i.e., designed features) and their fabricated (or simulated) counterparts. One or more problematic layout pattern library entries are generated, per step 811, based on one or more consolidated problematic layout patterns and associated electrical and/or performance characteristic variations, such as problematic layout pattern library entry 700. The generation of problematic layout pattern library entries may be based on other information retrieved from repository 101. At step 813, generated problematic layout pattern library entries may be stored to, for instance, problematic pattern library repository 107.

Referring again to FIG. 1, exemplary problematic layout pattern library entries stored to repository 107 may be utilized in association with one or more design analysis and/or verification processes to determine one or more performance metrics (or characteristics) associated with a fabricated version of a physical IC design, and to confirm whether such metrics are within design constraints. According to exemplary embodiments, process 100 utilizes multi-dimensional pattern matching process 105 to quickly and efficiently effectuate identification of problematic layout patterns within physical IC layout patterns (or designs). In this manner, physical IC layout patterns may be received (or retrieved) from, for instance, physical IC designs repository 109, which may be periodically updated, such as in response to receiving one or more modified physical IC designs from, for example, modified physical IC designs repository 133 or any other suitable memory or storage location. Repository 109 may, in certain embodiments, be embedded as part of one or more EDA tools, such as one or more design verification tools. An exemplary physical IC design is described in more detail in association with FIG. 10A.

Figure 9:
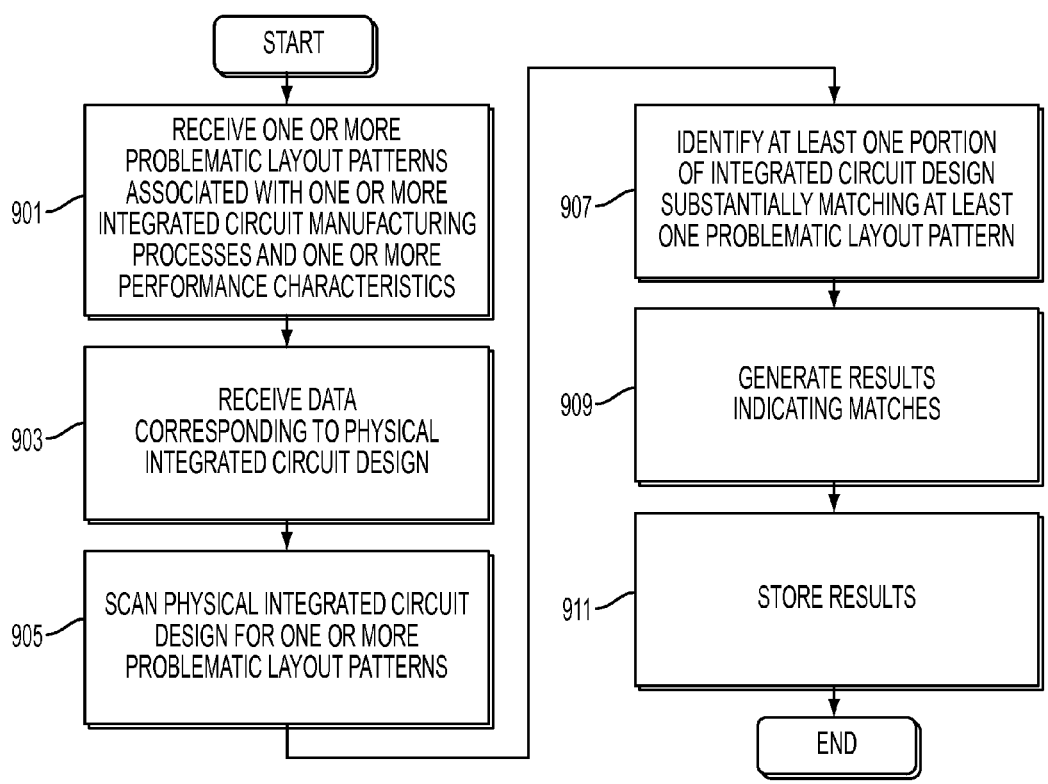
FIG. 9 is a flowchart of a process for identifying at least one problematic layout pattern within a physical integrated circuit design, according to an exemplary embodiment.
Figure 10A:
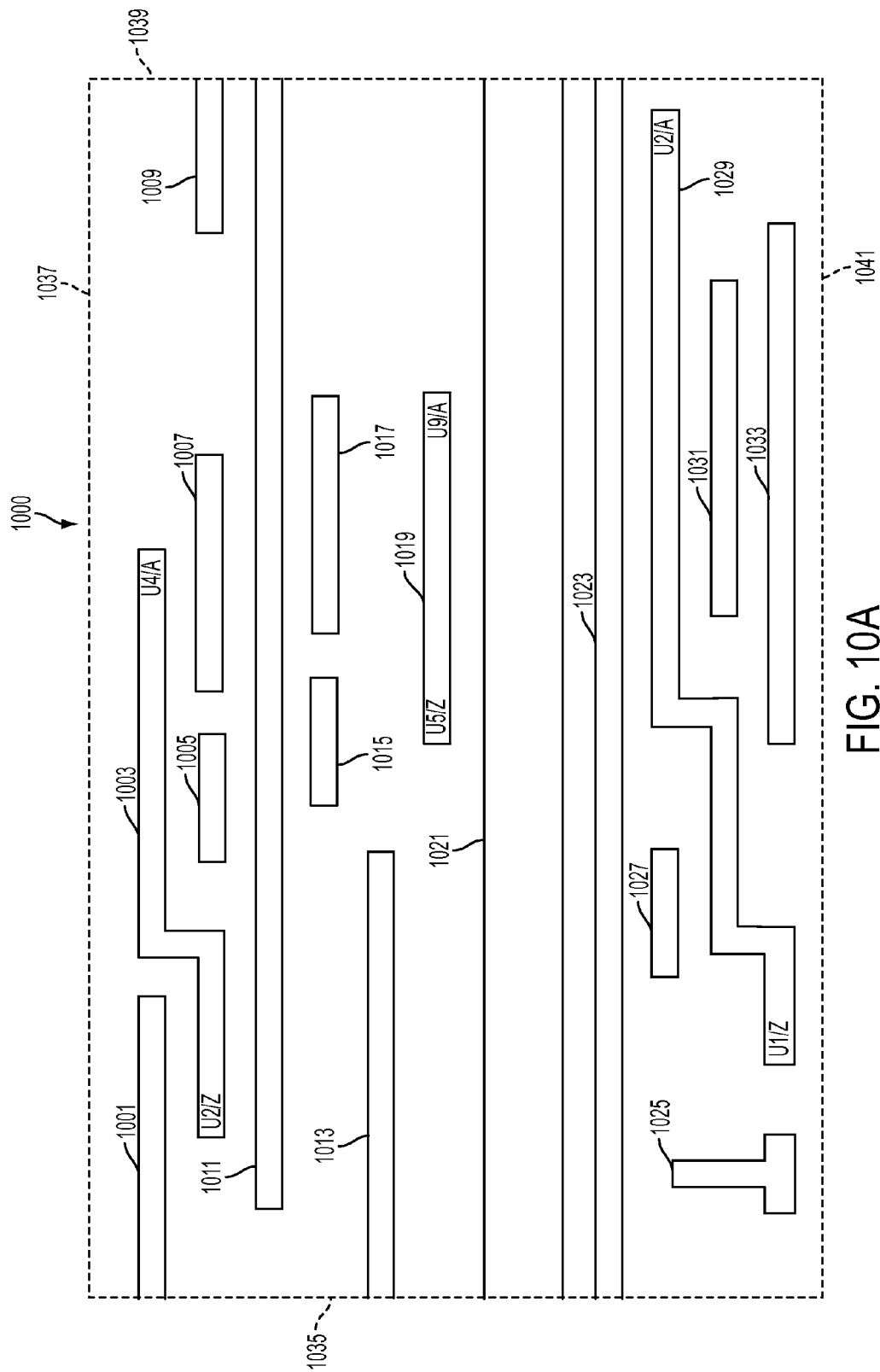
FIG. 10A schematically illustrates a physical integrated circuit design, according to an exemplary embodiment.
Figure 10B:
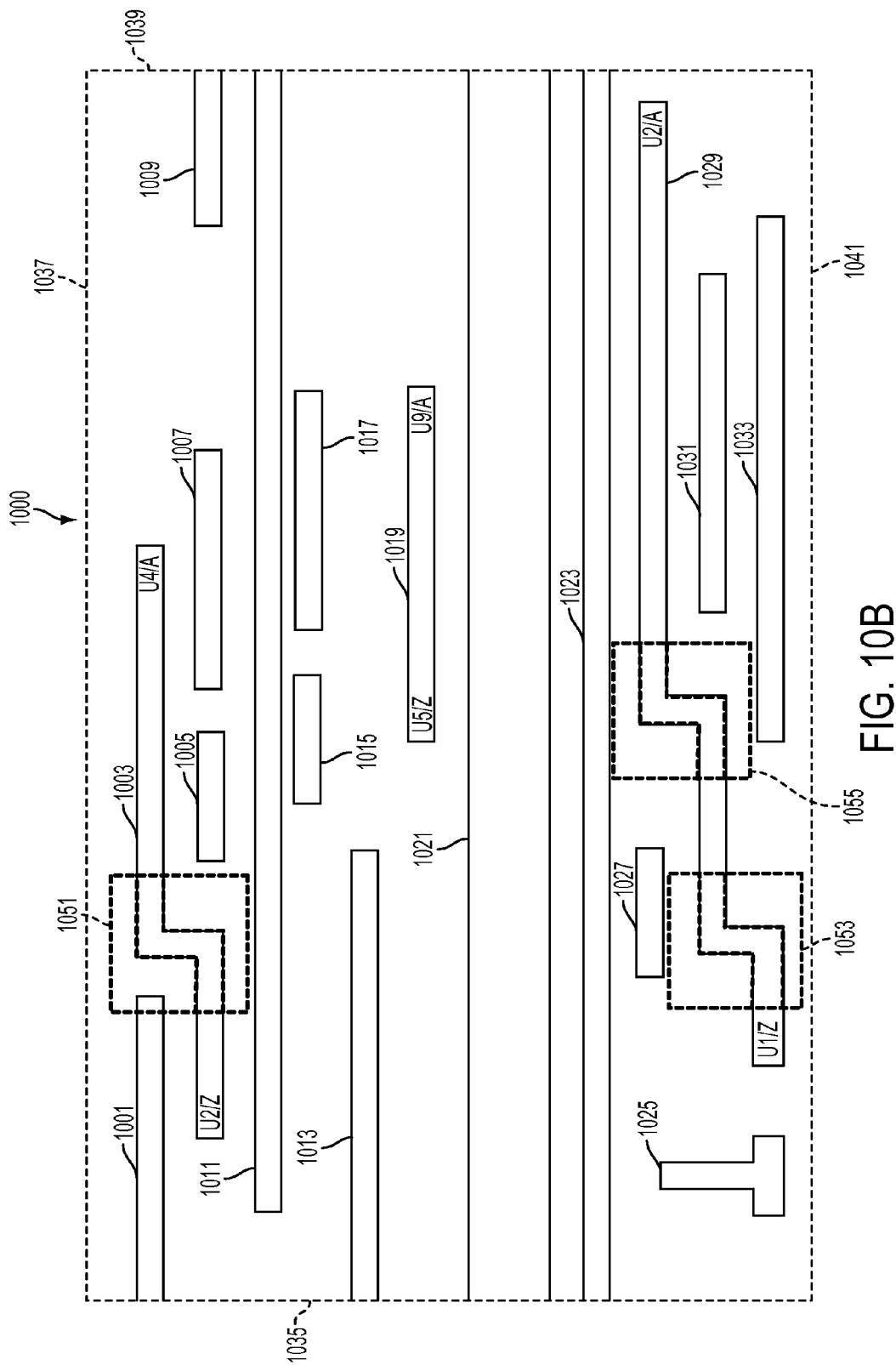
FIG. 10B schematically illustrates the physical integrated circuit design of FIG. 10A with identified problematic layout patterns, according to an exemplary embodiment.

According to exemplary embodiments, the identification of problematic layout patterns is described in more detail in conjunction with FIGS. 9 and 10B. In general, however, problematic layout patterns may, in certain embodiments, be identified based on one or more multi-dimensional pattern matching techniques carried out by process 105. For instance, a problematic layout pattern may be identified when a sufficient level of similarity is determined, via pattern matching process 105, to exist between at least a portion of a physical IC design and the problematic layout pattern. This sufficient level of similarity may be calculated based on determining an amount of area overlapping the portion of the physical IC design including the problematic layout pattern and at least one problematic layout pattern stored in association with one or more electrical and/or performance characteristics. In certain embodiments, process 105 may utilize one or more rectangle-based algorithmic determinations to effectuate these determinations and/or calculations. Further, the sensitivity of detection may be controlled through one or more sensitivity detection parameters, which may control the amount of overlapping area required for the portion of the physical IC design to be identified as corresponding to a problematic layout pattern. For example, a first level of detection sensitivity may require at least a first amount of overlapping area to be identified, whereas other levels of detection sensitivity may require different amounts of overlapping area to be identified. In this manner, process 105 may utilize one or more sensitivity parameters stored in association with problematic layout pattern library entries of repository 107. Thus, application of various sensitivities of detection by process 105 may result in the identification of at least one problematic layout pattern, such as one or more of problematic layout patterns 501 through 517. Additionally or alternatively, problematic layout patterns may be identified within physical IC designs via process 105 based on one or more multi-dimensional pattern matching techniques configured to scan for problematic layout patterns stored in association with one or more problematic layout pattern library entries, such as problematic layout patterns 701 and/or problematic layout patterns 707 through 721.

FIG. 9 is a flowchart of a process for identifying at least one problematic layout pattern within a physical integrated circuit design, according to an exemplary embodiment. For illustrative purposes, the process is described in association with FIGS. 1 and 7, as well as in association with FIGS. 10A and 10B, which are more fully described below. Further, the steps of the process may be performed in any suitable order, as well as combined or separated in any suitable manner. At step 901, multi-dimensional pattern matching process 105 may receive one or more problematic layout patterns (or data corresponding thereto) associated with one or more IC manufacturing processes, one or more electrical characteristics, and/or one or more performance metric variations from, for instance, repository 107. In exemplary embodiments, received problematic layout patterns may be further stored in association with one or more problematic layout pattern library entries. As such, the problematic layout pattern library entries may include layout data associated with at least one problematic layout pattern. Data corresponding to a physical IC layout pattern (or design) may be received by process 105, per step 903. For instance, process 105 may receive data corresponding to an exemplary physical IC design 1000, which is described in more detail in association with FIG. 10A.

As shown in FIG. 10A, design 1000 includes a plurality of geometric elements, such as geometric elements 1001 through 1033, spatially disposed in a multi-dimensional configuration, which may be bounded by, for instance, boundaries 1035 through 1041. In this example, the spatial positioning of geometric elements 1001 through 1033 may be free from physical and/or electrical design validation violations, however, may include one or more problematic layout patterns that, when actually manufactured, result in fabricated features exhibiting sufficiently altered physical characteristics and, thereby, electrical and/or performance properties. These altered properties (or characteristics) may cause, at least in part, one or more electrical design validation violations associated with those portions of the physical IC design including the problematic layout patterns, such as one or more timing delay violations. For instance, localized timing delays associated with portions of the physical IC design including one or more problematic layout patterns (such as a portion of an interconnect) may cause, at least in part, aggregated timing delays in the aggregated features of the physical IC design including the portions, such as one or more hold time delays or setup time delays.

Referring again to FIG. 9, multi-dimensional pattern matching process 105, at step 905, scans the physical IC design (i.e., the physical layout pattern of the physical IC design) for one or more problematic layout patterns. For example, process 105 may scan at least one portion of design 1000 within boundaries 1035 through 1041. Scanning processes may identify one or more problematic layout patterns based on one or more of the previously described techniques. In certain exemplary embodiments, scanning processes may be limited to searching for problematic layout patterns that cause (or are related to causing), at least in part, certain electrical and/or performance characteristic variations. For instance, a first scanning process may be utilized to identify one or more problematic layout patterns within physical IC designs that cause, at least in part, increased delay effects (e.g., setup time delay effects) in at least one portion of a physical IC design including at least one identified problematic layout pattern. Such scanning processes may be associated with determining "worst case" pattern adjusted timing constraints. Another (or second) scanning process may be utilized to identify one or more problematic layout patterns within physical IC designs that cause, at least in part, decreased delay effects (e.g., hold time delay effects) in at least one portion of a physical IC design including at least one identified problematic layout pattern. These scanning processes may be associated with determining "best case" pattern adjusted timing constraints. Yet another (or third) scanning process may be utilized to identify all problematic layout patterns within at least a portion of a physical IC design that cause, at least in part, some delay effect in at least the portion including at least one identified problematic layout pattern. These scanning processes may be associated with determining "aggregated" pattern adjusted timing constraints, which may result in hold time, setup time, or no time delay effects in the portion of the physical IC design to which scanning procedures are focused. In this manner, process 105 identifies, per step 907, at least one portion of the physical IC design matching (or substantially matching) at least one problematic layout pattern. As previously described, the sensitivity of detection may be controlled during process 105 via the application of one or more sensitivity parameters. Illustrative matches of problematic layout patterns are more fully explained in association with FIG. 10B.

FIG. 10B schematically illustrates the physical integrated circuit design of FIG. 10A with identified problematic layout patterns, according to an exemplary embodiment. As shown, design 1000 includes identified problematic layout patterns 1051 through 1055 corresponding to, for example, problematic layout pattern 701 of problematic layout pattern library entry 700. In this example, identified problematic layout patterns 1051 through 1055 in respective geometric elements 1003 and 1029 represent portions of, for instance, interconnects of physical IC design 1000.

Adverting once again to FIG. 9, process 105 may be configured to identify problematic layout patterns (in step 907) to facilitate one or more analysis and/or modification processes. For instance, identification of at least one problematic layout pattern within a physical IC design may be utilized to facilitate modification of netlist information associated with the physical IC design. According to other embodiments, identification of at least one problematic layout pattern within a physical IC design may be utilized to facilitate modification of one or more design constraints, whether designer specified or extracted, with or without being further utilized to facilitate modification of the netlist information. The identification of problematic layout patterns may be further utilized to facilitate timing analysis, design validation, and/or physical IC design modification determinations (or procedures). At step 909, process 105 generates pattern matching results indicating identified matches and, thereby, identified problematic layout patterns, which may also be presented to an IC designer via any suitable interface, such as at least one graphical user interface (GUI). In step 911, generated pattern matching results may be stored to, for instance, pattern matching results repository 111.

Referring once more to FIG. 1, pattern matching results may be provided to pattern adjusted timing netlist modification process 113 to enable netlist information corresponding to those portions of a physical IC design including at least one problematic layout pattern to be modified to increase the accuracy or pessimism of timing analysis determinations. In this manner, process 113 may be configured to receive (or retrieve) netlist information associated with a physical IC design including at least one problematic layout pattern from, for instance, IC design netlist repository 115. According to certain embodiments, repository 115 may be part of (or associated with) repository 109, such that any given netlist information associated with a physical IC design may be considered a logical extension thereof. Process 113 may then utilize pattern matching results along with electrical characteristics and/or performance metric variations associated therewith to modify the netlist information. According to certain embodiments, the electrical characteristics and/or performance metric variations may be stored in association with pattern matching results stored to repository 111. Additionally or alternatively, the variation information may be received (or retrieved) from repository 107 based on (or utilizing) the pattern matching results corresponding thereto. Modified netlist information may be stored to, for instance, modified IC design netlist repository 117. An exemplary process for modifying netlist information is described in more detail in association with FIGS. 11 and 12.

Figure 11:
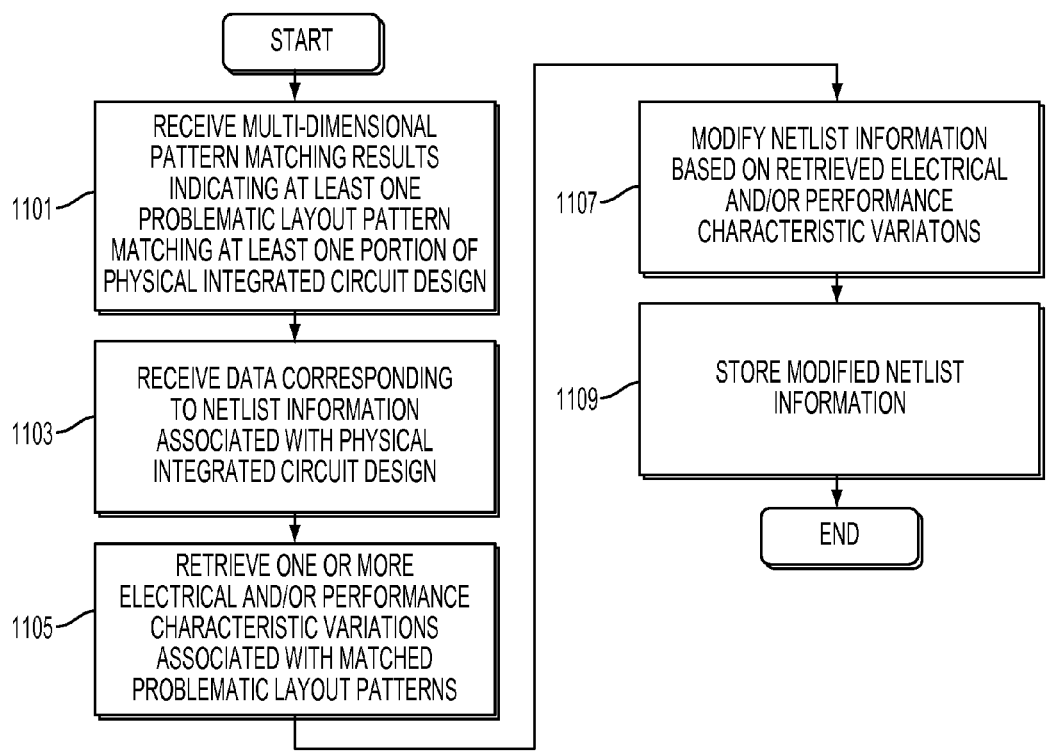
FIG. 11 is a flowchart of a process for modifying netlist information associated with a physical integrated circuit design based on at least one identified problematic layout pattern, according to an exemplary embodiment.

FIG. 11 is a flowchart of a process for modifying netlist information associated with a physical integrated circuit design based on at least one identified problematic layout pattern, according to an exemplary embodiment. For illustrative purposes, the process is described in association with FIGS. 1 and 10B, as well as in conjunction with FIG. 12, which is more fully described below. Further, the steps of the process may be performed in any suitable order, as well as combined or separated in any suitable manner. At step 1101, process 113 receives (or retrieves) from, for instance, repository 111 multi-dimensional pattern matching results indicating at least one problematic layout pattern matching at least one portion of a physical IC design. In step 1103, data corresponding to netlist information associated with the physical IC design including the at least one problematic layout pattern is received (or retrieved) from, for instance, repository 115 and/or 109. According to one embodiment, the netlist information may be retrieved based on (or utilizing) the pattern matching results of repository 111 and/or information associated therewith. One or more electrical and/or performance characteristic variations associated with matched problematic layout patterns may be retrieved from, for instance, problematic layout patterns repository 107, per step 1105. As with the netlist information, characteristic variation information may be retrieved from repository 107 based on the pattern matching results of repository 111 and/or information associated therewith. Additionally or alternatively, characteristic variation information may be included as part of the multi-dimensional pattern matching results of repository 111 and, thereby, may be received in association therewith. In step 1107, retrieved netlist information may be modified based on the electrical and/or performance characteristic variations and the multi-dimensional pattern matching results. Exemplary modified netlist information is described in more detail in association with FIG. 12. At step 1109, however, the modified netlist information may be stored to, for example, repository 117.

Figure 12:
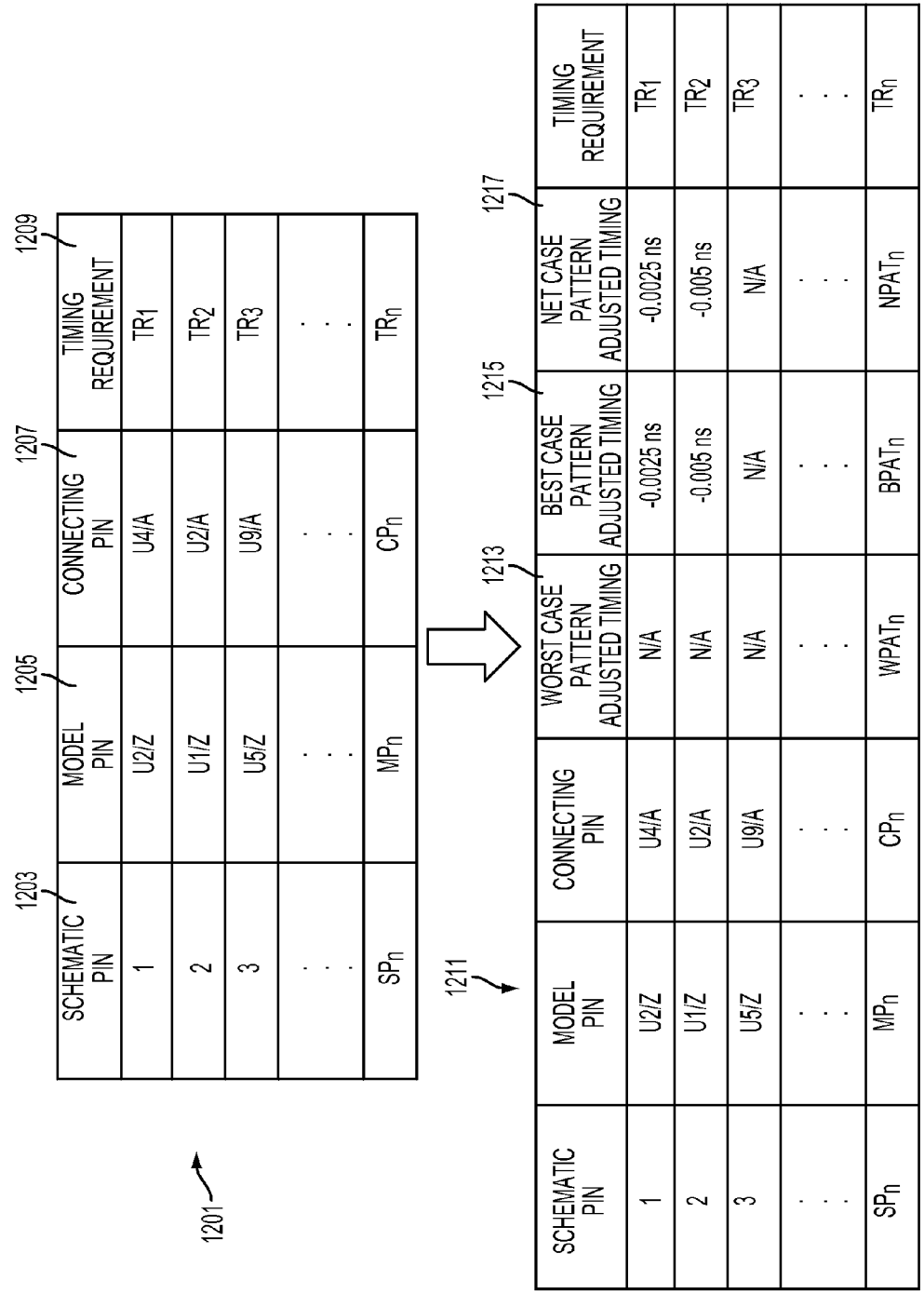
FIG. 12 schematically illustrates modified netlist information associated with the physical integrated circuit layout design of FIG. 10A that has been modified based on the identified problematic layout patterns of FIG. 10B, according to an exemplary embodiment.

FIG. 12 schematically illustrates modified netlist information associated with the physical integrated circuit layout design of FIG. 10A that has been modified based on the identified problematic layout patterns of FIG. 10B, according to an exemplary embodiment. As shown, netlist information 1201 is provided in tabular form and includes schematic pin information 1203, model pin information 1205, connecting pin information 1207, and timing requirement information 1209 associated with interconnects defined between corresponding model pins and schematic pins. For instance, constituent geometric elements 1003, 1019, and 1029 of FIG. 10A represent individual interconnects respectively defined between model pin U2/Z and connecting pin U4/A, model pin U5/Z and connecting pin U9/A, and model U1/Z and connecting pin U2/A. These interconnects are respectively associated with corresponding timing requirements $TR_1$, $TR_3$, and $TR_2$. Based on the identification of problematic layout patterns 1051 through 1055, netlist information 1201 may be modified to correspond to modified netlist information 1211. In this manner, modified netlist information further includes "worst-case" pattern adjusted timing information 1213, "best-case" pattern adjusted timing information 1215, and "net case" (or aggregated) pattern adjusted timing information 1217. In this example, the identification of problematic layout patterns 1051 through 1055 causes, at least in part, one or more electrical characteristics and, thereby, performance metric variations corresponding to decreased time delays in associated geometric elements 1003 and 1029. By contrast, geometric element 1019 does not include nor is affected by any problematic layout patterns and, therefore, modified netlist information 1213 does not include any entry adjustments associated with electrical and/or performance characteristics of the interconnect.

Adverting back to FIG. 1, modified netlist information stored to, for instance, repository 117, may be provided to timing analysis process 119 to facilitate one or more timing analysis and/or design verification determinations. According to various exemplary embodiments, timing analysis process 119 may be configured to execute one or more static timing analysis (STA) and/or statistical STA (SSTA) determinations. In this manner, the modified netlist information may be utilized in association with one or more design constraints, which may be specified by at least one designer of the physical IC design and/or extracted from the physical IC design. Design constraints specified by at least one designer may be stored to, for instance, design constraint repository 121. Design constraints (or parasitic characteristics) extracted from the physical IC design may be stored to parasitic extraction results repository 123. The design constraints (or parasitic characteristics) may have been determined and, thereby, stored in association with interconnect parasitic extraction process 125, which may be configured to extract one or more parasitic characteristics from data associated with a physical IC design stored to, for instance, repository 109. Additionally (or alternatively) multi-dimensional pattern matching results stored to, for instance, repository 111 may be utilized to modify, such as directly modify, one or more design constraints, whether designer specified or extracted, without being further utilized to modify the netlist information. In this manner, electrical and/or performance characteristic information associated with identified problematic layout patterns included as part of the multi-dimensional pattern matching results may be extracted from the multi-dimensional pattern matching results and utilized to modify corresponding information stored to design constraints repository 121 and/or parasitic extraction results repository 123. According to one embodiment, design constraints stored to repositories 121 and 123 may relate to "best case," "worst case," and/or "net (or aggregated) case" timing information. As such, timing analysis process 119 may utilize modified netlist information in conjunction with corresponding design constraint information stored to one or more of repositories 121 and 123 to execute one or more timing analysis determinations. Timing analysis process 119 may further utilize one or more design validation rules stored to design validation rules repository 127 to facilitate design validation determinations, such as electrical design validation determinations. Timing analysis and/or design validation results may be stored to, for instance, timing analysis repository 129. An exemplary process for executing at least one timing analysis and design verification process is described in more detail in association with FIGS. 13 and 14.

Figure 13:
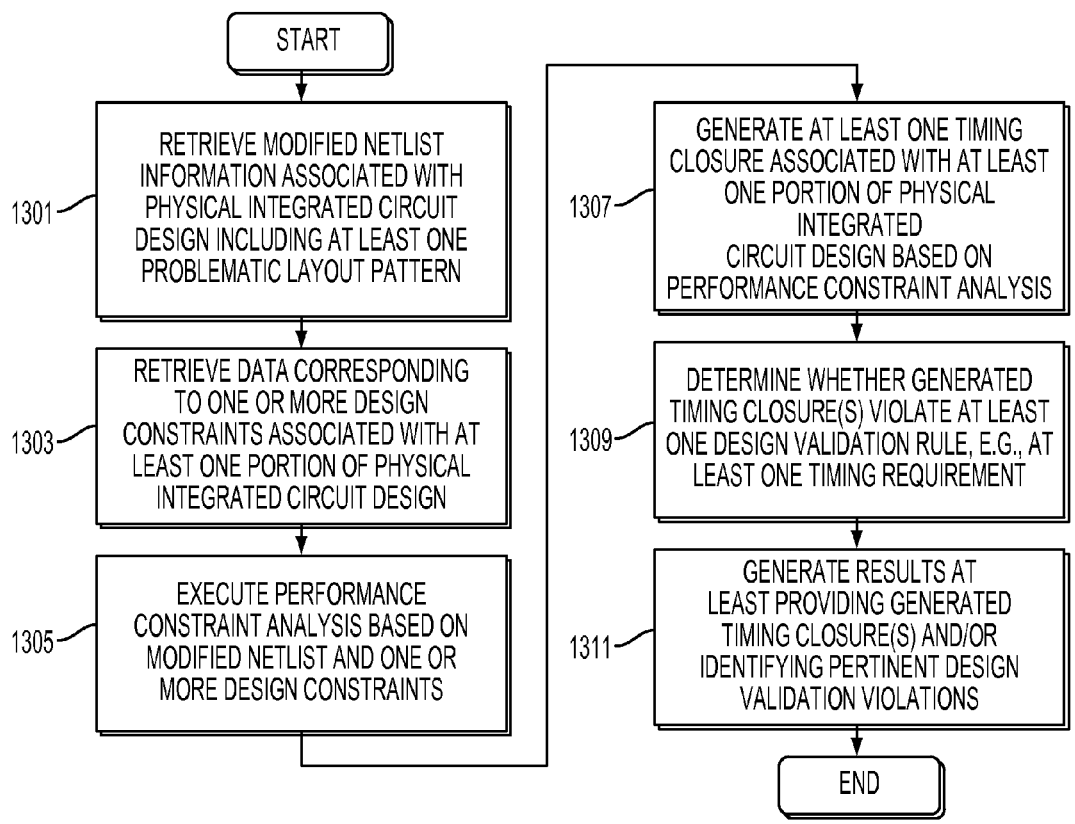
FIG. 13 is a flowchart of a process for executing at least one timing analysis and design verification process based on a modified netlist and one or more design constraints, according to an exemplary embodiment.

FIG. 13 is a flowchart of a process for executing at least one timing analysis and design verification process based on a modified netlist and one or more design constraints, according to an exemplary embodiment. For illustrative purposes, the process is described in association with FIGS. 1 and 12, as well as in conjunction with FIG. 14, which is more fully described below. Further, the steps of the process may be performed in any suitable order, as well as combined or separated in any suitable manner. At step 1301, process 119 retrieves (or receives) from, for example, repository 117 modified netlist information associated with a physical IC design including at least one problematic layout pattern. In step 1303, data corresponding to one or more design constraints associated with at least one portion of the physical IC design may be retrieved from, for instance, repositories 121 and/or 123. Based on the modified netlist information and the retrieved design constraint information, process 119 is configured, per step 1305, to execute at least one performance constraint analysis, such as one or more timing analysis determinations, e.g., one or more STA or SSTA determinations. According to one embodiment, process 119 is configured to determine one or more "worst-case," "best-case," and/or "net case" timing analysis determinations. At step 1307, process 119 generates at least one timing closure associated with the at least one portion of the physical IC design based on the performance constraint analysis. For instance, timing closure information associated with one or more interconnects of the physical IC design may be determined. As such, generated timing closure information may be compared, in step 1309, against at least one design validation rule (e.g., timing requirement) stored to, for instance, repository 127. In this manner, process 119 may determine whether the at least one portion of the physical IC design violates any of the at least one design validation rules. Design validation results may be generated and configured at least to provide timing closure information and/or to identify pertinent design verification violations, per step 1311.

FIG. 14 schematically illustrates timing analysis and design verification results, according to an exemplary embodiment. As shown, timing analysis and design verification results 1400 are associated with the identification of problematic layout patterns 1051 through 1055 within design 1000 and, thereby, the modification of netlist information 1201 to modified netlist information 1211. According to one embodiment, timing analysis and design verification results 1400 include schematic pin information 1401, model pin information 1403, connecting pin information 1405, timing requirement information 1407 associated with interconnects defined between corresponding model pins and connecting pins, timing analysis result information 1409 related to respective interconnects, and design verification result information 1411 also related to respective interconnects. For instance, constituent geometric elements 1003, 1019, and 1029 of FIG. 10A, representing individual interconnects and being respectively associated with timing requirements $TR_1$, $TR_3$, and $TR_2$, may be correspondingly associated with timing analysis results $TAR_1$, $TAR_3$, and $TAR_2$. In this example, the inclusion of problematic layout patterns 1053 and 1055 within geometric element 1029 has resulted in timing analysis result $TAR_2$ that violates timing requirement $TR_2$ and, therefore, is associated with design verification violation 1413. Despite the inclusion of problematic layout pattern 1051 within geometric element 1003, timing analysis result $TAR_1$ does not violate timing requirement $TR_1$ and, therefore, is associated with passing design verification determination 1415.

Referring once more to FIG. 1, timing analysis and/or design verification results 129 may be provided to design modification process 131 to enable corresponding physical IC designs, and, thereby, the physical layout patterns including identified problematic layout patterns causing, at least in part, one or more design verification violations, to be modified to remove the problematic layout patterns and/or adjust one or more physical characteristics of constituent geometric elements. In certain embodiments, process 131 may additionally (or alternatively) reposition constituent geometric elements of at least one portion of the physical IC design to determine at least one new spatial configuration of constituent geometric elements where their adjusted physical layout pattern no longer violates design verification rules. Process 131 may, in certain exemplary embodiments, receive one or more design verification rules that may not be violated during modification processes so as to ensure that no new design verification violations are configured in the process of remedying the physical IC design. As such, process 131 may employ (or implement) the features and functions of one or more of processes 105, 113, and/or 119, as well as one or more conventional physical design verification and/or physical design verification plus processes to ensure a modified physical IC design is not associated with design verification violations. In one embodiment, process 131 stores at least one modified version of the physical IC design to modified IC design repository 133, which may also include one or more other modified designs. An exemplary modified physical IC design is described in more detail in association with FIG. 16.

Figure 15:
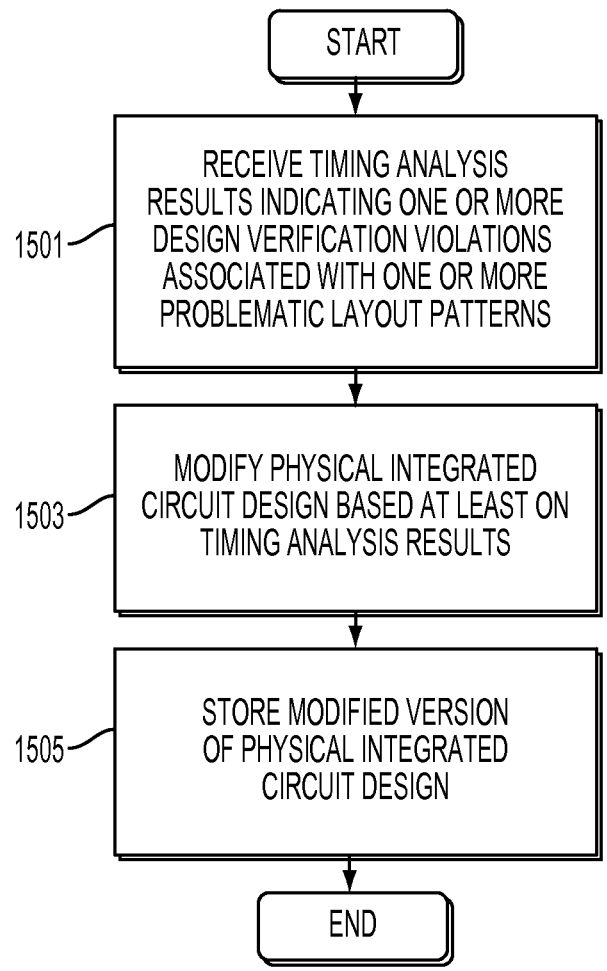
FIG. 15 is a flowchart of a process for modifying a physical integrated circuit design based on timing analysis and design verification results, according to an exemplary embodiment.

FIG. 15 is a flowchart of a process for modifying a physical integrated circuit design based on timing analysis and design verification results, according to an exemplary embodiment. For illustrative purposes, the process is described in association with FIG. 1, as well as in association with FIG. 16, which is explained in more detail below. Further, the steps of the process may be performed in any suitable order, as well as combined in any suitable manner. At step 1501, process 131 receives timing analysis and/or design verification results indicating one or more timing analysis violations associated with a physical IC design including at least one problematic layout pattern, such as design 1000. Based on the results, process 131 modifies the layout design, per step 1503.

Figure 16:
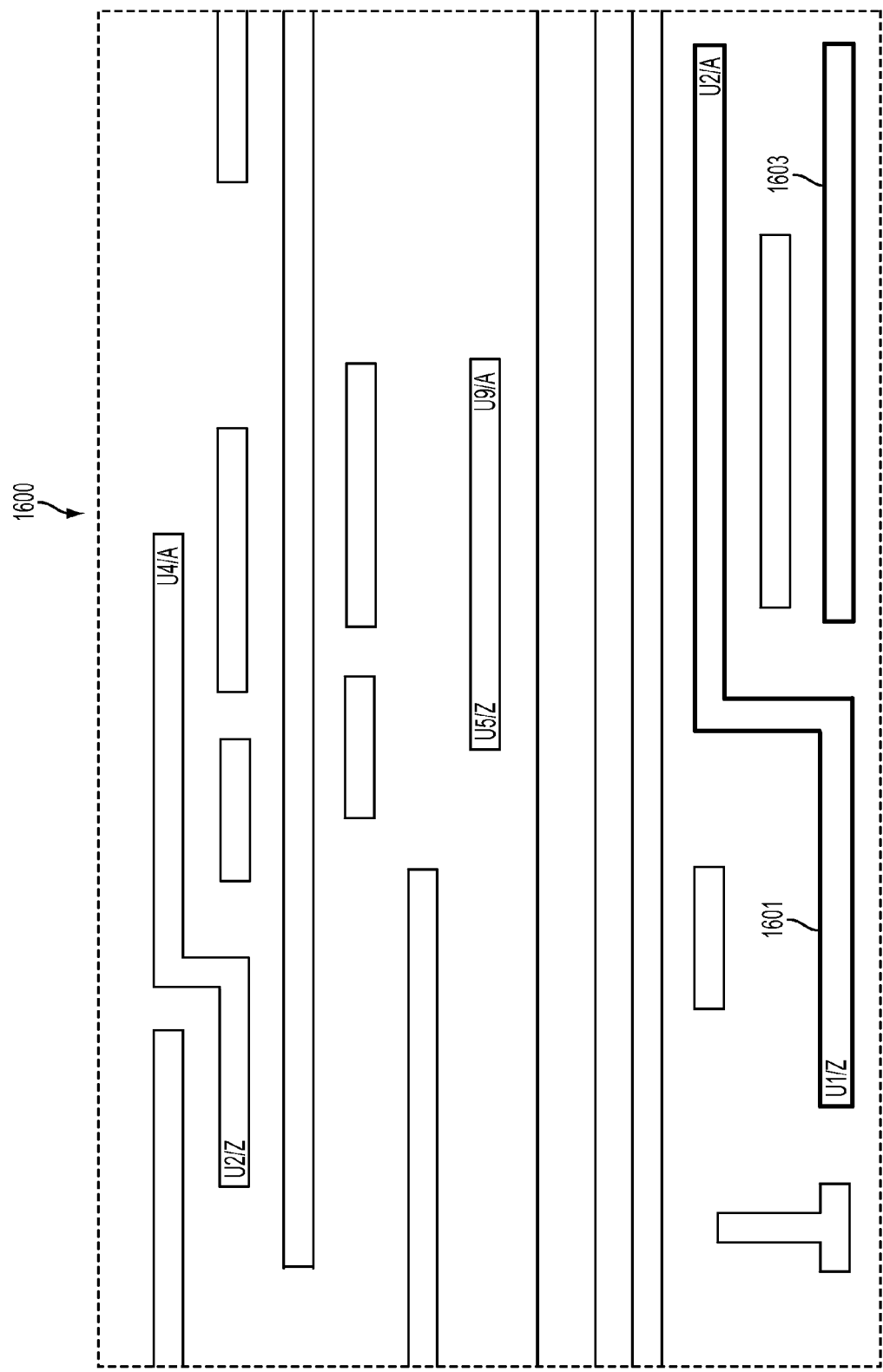
FIG. 16 schematically illustrates a modified physical integrated circuit design that has been modified based on timing analysis and design verification results, according to an exemplary embodiment.

For instance, process 131 may modify design 1000 exhibiting problematic layout patterns 1051 through 1055 by reconfiguring and/or repositioning constituent geometric elements of design 1000 to remove design verification violation 1413. FIG. 16 schematically illustrates a modified physical integrated circuit design that has been modified based on timing analysis and design verification results, according to an exemplary embodiment. In this example, modified physical IC design 1600 includes constituent geometric elements 1601 and 1603. In this manner, constituent geometric element 1601 has been reconfigured to remove identified problematic layout patterns 1053 and 1055, as well as to enable the timing characteristics of the reconfigured interconnect to no longer exhibit design verification violation 1413. Constituent geometric element 1603 corresponds to constituent geometric element 1033, which has been repositioned to its current spatial position so as to enable the reconfigured aspects of constituent geometric element 1601 to exist in their reconfigured form.

Adverting again to FIG. 15, process 131 may store, per step 1505, at least one modified version of physical IC design 1000 to, for instance, repository 133. For example, modified physical IC design 1600 may be stored to repository 133.

Figure 17:
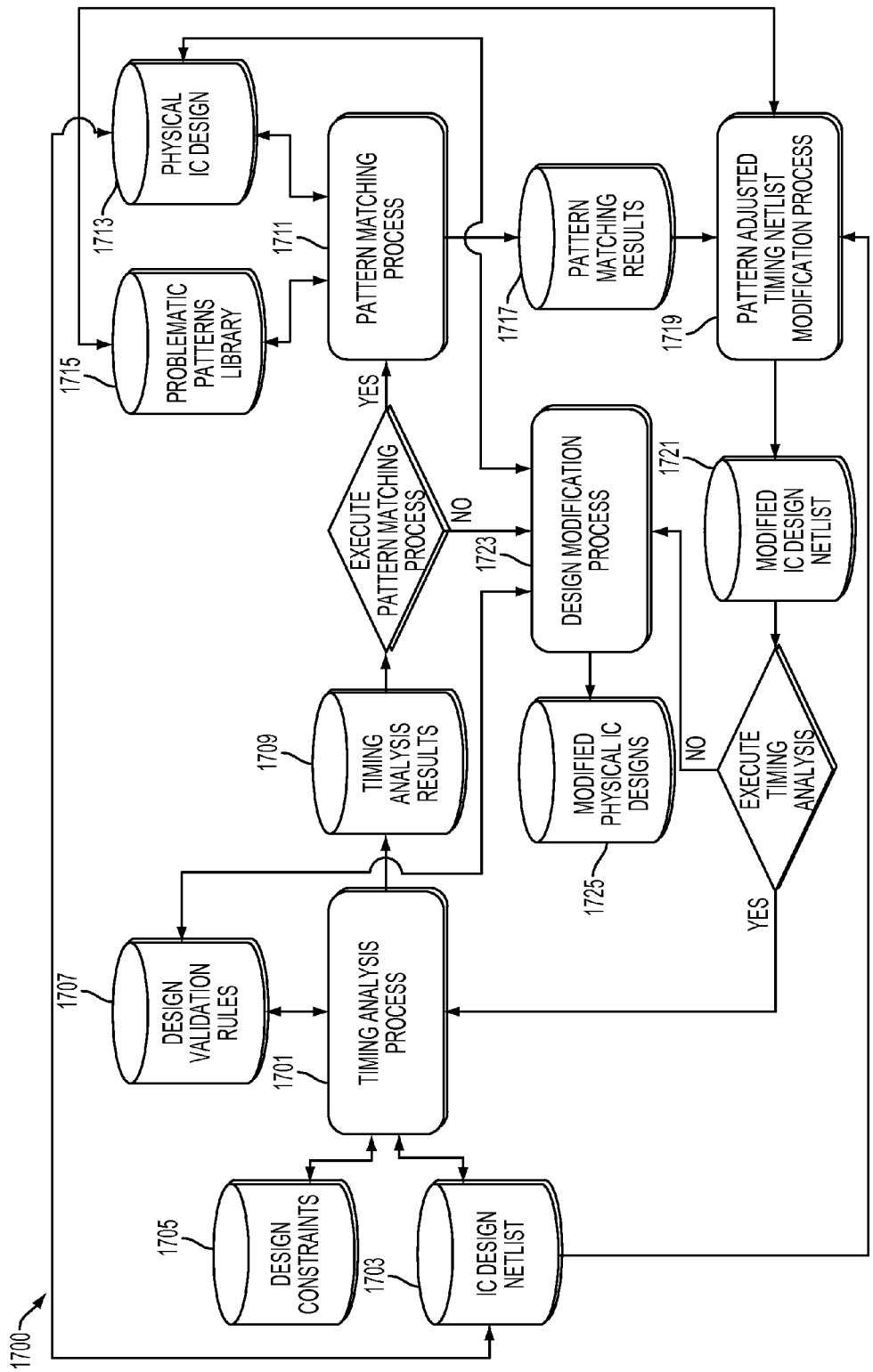
FIG. 17 schematically illustrates an overall process flow for providing timing analysis confidence determinations via pattern matching, according to an exemplary embodiment.

According to another exemplary embodiment, overall process flow 100 may be reconfigured to facilitate timing analysis confidence determinations. FIG. 17 schematically illustrates an overall process flow for providing timing analysis confidence determinations via pattern matching, according to an exemplary embodiment. To provide timing analysis confidence determinations via pattern matching, process flow 1700 may begin with one or more initial (or first) conventional timing analysis determinations via timing analysis process 1701. These timing analysis determinations may comprise STA and/or SSTA determinations. The initial conventional timing analysis determination(s) may be based on conventional netlist information and one or more design constraints, both of which may be associated with one or more portions of a physical IC design, such as one or more interconnects of the physical IC design. In one embodiment, conventional netlist information may be stored to, for instance, IC design netlist repository 1703. Repository 1703 may, in certain embodiments, be part of (or associated with) physical IC design repository 1713, such that any given netlist information associated with a physical IC design may be considered a logical extension thereof. One or more design constraints may be stored to, for example, design constraints repository 1705. The design constraints may be specified by at least one designer of the physical IC design and/or extracted from the physical IC design that is associated with the conventional netlist information. In this manner, process 1701 may generate one or more timing closures (or other performance constraint based information) associated with the one or more portions of the physical IC design, such as one or more timing closures associated with one or more interconnects of the physical IC design. It is noted that the timing closure information may be "worst-case," "best-case," and/or "net case" timing closures. Initial timing analysis determinations may correspond to those associated with FIGS. 1, 13 and 14; however, they may be generated based on conventional netlist information as opposed to modified netlist information.

According to exemplary embodiments, process 1701 may also determine whether the determined timing closures do not violate any performance constraint requirements and/or electrical design requirements, such as one or more timing requirements. As such, process 1701 may further utilize one or more design validation rules stored to, for instance, design validation repository 1707 to generate one or more timing analysis and/or design verification results. The results may be stored to, for instance, timing analysis results repository 1709. Initial design verification determinations may also correspond to those associated with FIGS. 1, 13, and 14.

If any of the portion(s) of the physical IC design exhibit at least one design verification violation, such as at least one timing closure violation, multi-dimensional pattern matching process 1711 may be utilized to scan the portion(s) of the physical IC design for one or more problematic layout patterns. In this manner, multi-dimensional pattern matching process 1711 may limit identification of problematic layout patterns to those portions (e.g., interconnects) of the physical IC design exhibiting the design verification violations. Physical IC designs may be stored to, for example, physical IC design repository 1713. Problematic layout patterns may be stored in association with one or more library entries stored to, for instance, problematic layout pattern library repository 1715. The results of process 1711 may be stored to, for instance, pattern matching results repository 1717. Accordingly, the identification of problematic layout patterns may correspond to those associated with FIGS. 1, 9, and 10B; however, they may be identified in those portions of a physical IC design associated with one or more design verification violations.

In one embodiment, multi-dimensional pattern matching results stored to repository 1717 may be utilized by pattern adjusted timing netlist modification process 1719 to modify conventional netlist information associated with those portions of the physical IC design including one or more problematic layout patterns and associated with at least one design verification violation, such as at least one timing violation. As such, process 1719 may receive conventional netlist information from, for example, repository 1703. If necessary, electrical and/or performance characteristic variation information associated with one or more identified problematic layout patterns may be retrieved (or received) from, for instance, repository 1715. In other embodiments, such information may be included as part of exemplary multi-dimensional pattern matching results stored to repository 1717. As such, modified netlist information associated with the portions of the physical IC design including one or more problematic layout patterns and exhibiting at least one design verification violation may be stored to, for instance, repository 1721. Modification of netlist information may correspond to those modifications described with respect to FIGS. 1, 11, and 12.

According to various exemplary embodiments, the modified netlist information of repository 1721 may be provided to process 1701 to facilitate one or more second timing analysis determinations, such as those described in association with FIGS. 1, 13, and 14. In this manner, the modified netlist information may be utilized in association with one or more design constraints stored to, for instance, repository 1705 to execute one or more timing analysis confidence determinations and one or more timing analysis confidence determinations. That is, process 1701 may be utilized to determine, for instance, one or more second timing closures associated with those portions of the physical IC design including one or more problematic layout patterns and associated with at least one design verification violation. Second timing closure information may be compared in association with corresponding first timing closure information to determine one or more confidence levels. Furthermore, the comparison may be performed in association with one or more corresponding design verification rules (e.g., timing requirements) to determine whether corresponding design verification violations (e.g., timing violations) still remain valid, such as those described in association with FIGS. 1, 13, and 14. It is noted that the process associated with FIG. 17 may be useful in association with the design of physical ICs requiring relatively narrow timing windows and/or other stringent electrical and/or performance characteristics.

As with overall process 100, process 1700 may utilize the results of the second timing analysis and/or second design verification determinations to modify, as necessary, one or more aspects of the physical IC design. Design modification process 1723 may be configured for such purposes. In one embodiment, the process of modifying one or more physical IC designs may relate to the processes described in association with FIGS. 1, 15, and 16. As such, process 1723 may remove one or more problematic layout patterns, adjust one or more physical characteristics of constituent geometric elements, and/or create at least one new spatial configuration of constituent geometrics elements where the modified physical layout pattern of a modified physical IC design no longer violates design verification rules, such as one or more timing requirement rules. Process 1723 may, in certain exemplary embodiments, receive one or more design verification rules that may not be violated during modification processes so as to ensure that no new design verification violations are configured in the process of remedying the physical IC design. These design verification rules may be retrieved (or received) from, for instance, repository 1707. As such, process 1723 may employ (or implement) the features and functions of one or more of processes 1701, 1711, and/or 1719, as well as one or more conventional physical design verification and/or physical design verification plus processes to ensure a modified physical IC design is not associated with design verification violations. In one embodiment, process 1723 stores at least one modified version of the physical IC design to modified IC design repository 1725, which may also include one or more other modified physical IC designs.

Figure 18:
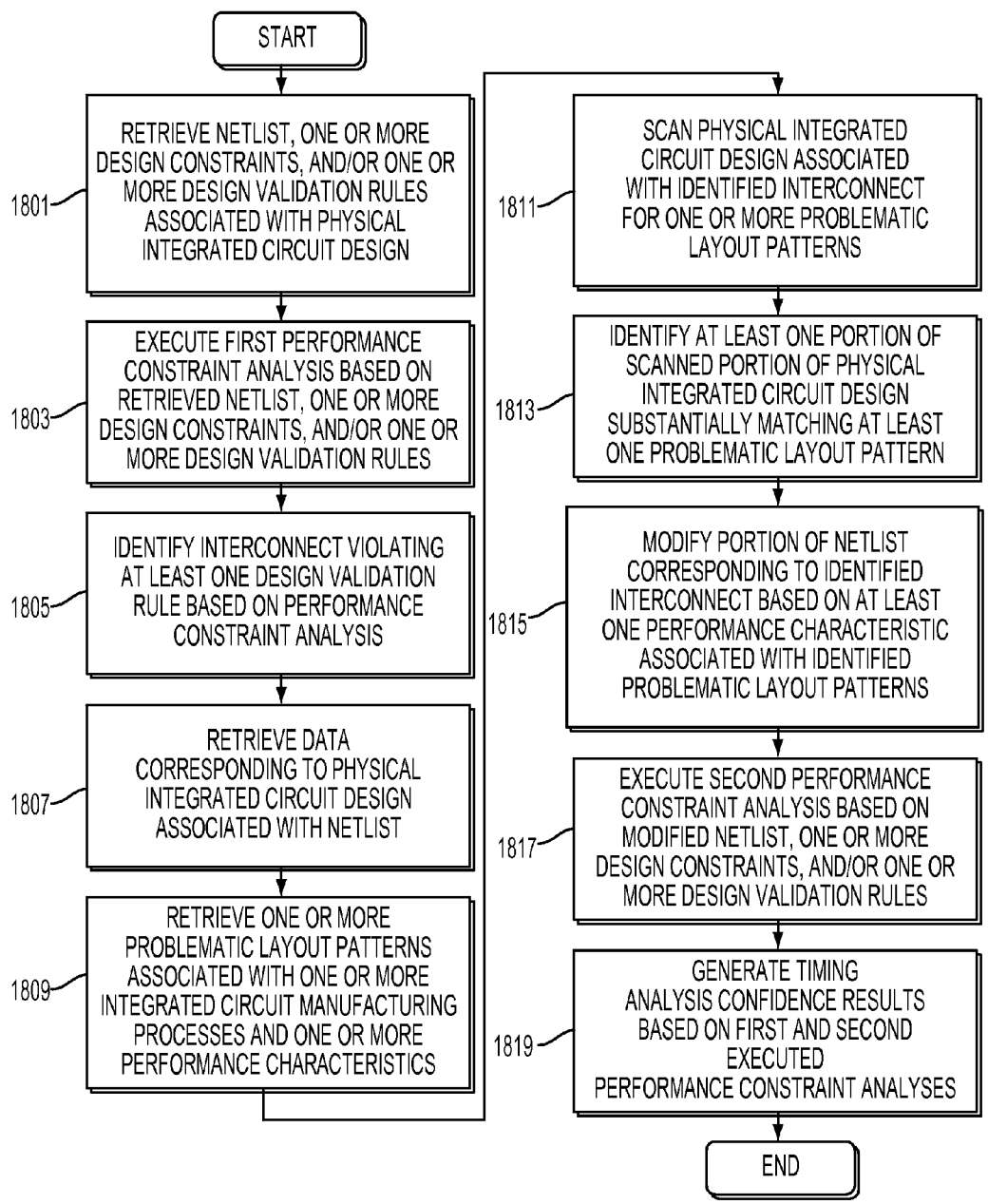
FIG. 18 is a flowchart of a process for providing timing analysis confidence determinations via pattern matching, according to an exemplary embodiment.

FIG. 18 is a flowchart of a process for providing timing analysis confidence determinations via pattern matching, according to an exemplary embodiment. For illustrative purposes, the process is described in association with FIG. 17. Further, the steps of the process may be performed in any suitable order, as well as combined in any suitable manner. At step 1801, process 1701 retrieves (or receives) conventional netlist information, one or more design constraints, and/or one or more design validation rules associated with a physical IC design. At least one initial performance constraint analysis (e.g., timing analysis) is executed, per step 1803, based on the retrieved conventional netlist information, design constraints, and/or design validation rules. In step 1805, process 1701 identifies one or more portions of the physical IC design, such as one or more interconnects, violating at least one design validation rule based on the results of the performance constraint analysis. For instance, process 1701 may identify one or more interconnects exhibiting timing closures violating at least one timing requirement rule.

To provide more confidence in association with the results of the timing analysis determinations, one or more multi-dimensional pattern matching processes may be employed. As such, process 1711 may receive data corresponding to the physical IC design associated with the conventional netlist information, per step 1807. In step 1809, one or more problematic layout patterns associated with one or more IC manufacturing processes and/or one or more electrical and/or performance characteristics may be retrieved (or received) by process 1711. At step 1811, process 1711 scans the physical IC design associated with the identified one or more portions of the physical IC design, e.g., one or more interconnects, for one or more problematic layout patterns. At least one portion of the scanned portions of the physical IC design is identified as matching (or substantially matching) at least one problematic layout pattern, per step 1813. Based on one or more electrical and/or performance characteristic variations associated with identified problematic layout patterns, process 1719 modifies (in step 1815) at least one portion the conventional netlist information corresponding to the identified portions, e.g., identified interconnects, of the physical IC design exhibiting the one or more design verification violations. At step 1817, process 1701 executes at least one second performance constraint analysis, e.g., timing analysis, determination based on the modified netlist information and the one or more design constraints and/or design verification rules retrieved in association with step 1803. Timing analysis confidence results are generated, per step 1819, based on the one or more first and second executed performance constraint analysis determinations.

Figure 19:
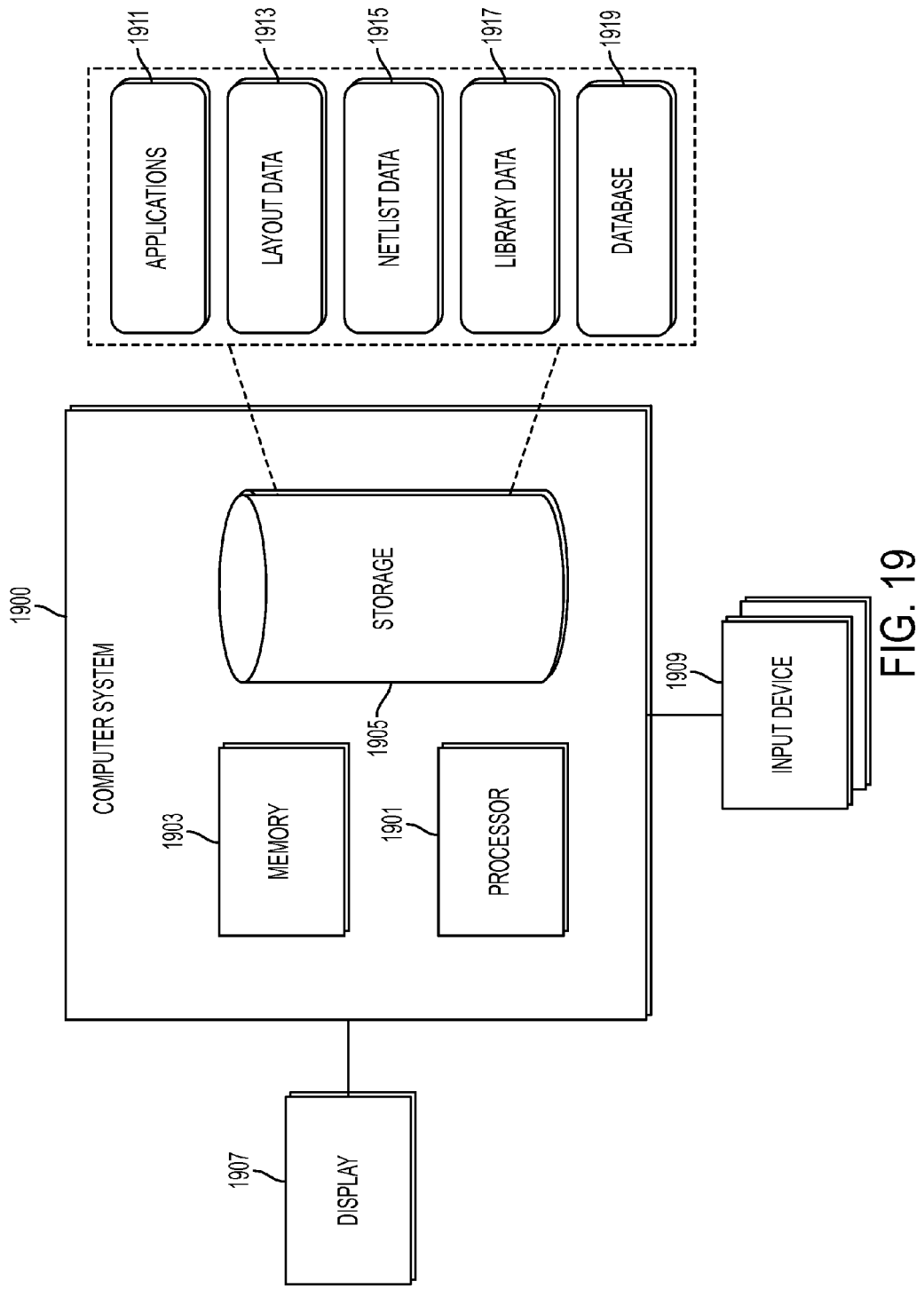
FIG. 19 schematically illustrates a computer system, according to an exemplary embodiment.

The processes described herein may be implemented via software, hardware, firmware, or a combination thereof. Exemplary hardware (e.g., computing hardware) configured for such purposes is schematically illustrated in FIG. 19. As shown, computer system 1900 includes at least one processor 1901, at least one memory 1903, and at least one storage 1905. Computer system 1900 may be coupled to display 1907 and one or more input devices 1909, such as a keyboard and a pointing device. Display 1907 may be utilized to provide one or more GUI interfaces, such as one or more analyzing, characterizing, matching, modifying, etc., interfaces. Input devices 1909 may be utilized by users of computer system 1900 to interact with, for instance, the one or more GUI interfaces. Storage 1905 may be utilized to store applications 1911, layout data (or information) 1913, netlist data 1915, library data 1917, and/or at least one other database (or repository) 1919. Applications 1911 may include instructions (or computer program code) that when executed by at least one processor 1901 are configured to cause computer system 1900 to perform one or more processes, such as one or more of the processes described herein.

According to various exemplary embodiments, applications 1911 may include one or more EDA tools, such as one or more design analyzing, characterizing, matching, modifying, verifying, and/or the like tools, which may be utilized to generate one or more problematic layout pattern libraries for identifying and accounting for problematic layout patterns within later arising physical IC designs that are associated with processing variations when such problematic layout patterns are fabricated utilizing one or more manufacturing processes. In other embodiments, applications 1911 may include or more EDA tools configured to modify later arising physical IC designs including one or more identified problematic layout patterns to remove such patterns or the effects associated therewith from the later arising physical IC design. According to other embodiments, applications 1911 may be utilized to generate timing confidence information.

Embodiments of the present disclosure can achieve several technical effects, such as being quickly and efficiently enforceable, and providing pass/no-pass criteria. It also provides simple documentation within design manuals, it is not as computationally intensive as rules-based or simulation-based approaches, and it does not require highly-accurate manufacturability models, such as lithographic or other manufacturing-based models, that may not even be available during design verification processes. This enables embodiments of the present disclosure to be applied early in the design flow, as well as enforced in conjunction with other conventional design verification techniques, if desired. Further, embodiments of the present disclosure enable problematic layout patterns to be identified, understood, and handled to improve yield, reliability, and/or performance of an IC design. As such, embodiments of the present disclosure enable faster design cycles, as well as more cost-effective approaches to design and design verification processes. The present disclosure enjoys industrial applicability in any of various types of highly integrated semiconductor devices, such as non-volatile memory devices, particularly sub-30 nm devices.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
  receiving, at least in part, data corresponding to a predetermined problematic layout pattern, the problematic layout pattern being associated with at least one performance characteristic, the problematic layout pattern being one or more geometric elements;
  receiving, at least in part, data corresponding to an integrated circuit layout design;
  scanning the integrated circuit layout design for the one or more geometric elements of the problematic layout pattern;
  identifying at least one portion of the integrated circuit layout design substantially matching the problematic layout pattern; and
  modifying a netlist associated with the integrated circuit layout design based on the at least one performance characteristic,
  wherein at least one step of said method is executed by a processor.

2. The method according to claim 1, further comprising:
  receiving, at least in part, data corresponding to one or more design constraints associated with the at least one portion of the integrated circuit layout design;
  executing a performance constraint analysis based on the modified netlist and the one or more design constraints; and
  generating a timing closure associated with the at least one portion of the integrated circuit layout design based on the performance constraint analysis.

3. The method according to claim 2, further comprising:
  extracting one or more parasitic values associated with the at least one portion of the integrated circuit layout design; and
  storing the one or more parasitic values as the one or more design constraints.

4. The method according to claim 2, wherein the one or more design constraints are specified by at least one designer of the integrated circuit layout design.

5. The method according to claim 1, further comprising:
receiving, at least in part, data corresponding to one or more design constraints associated with the integrated circuit layout design;
executing a performance constraint analysis based on the one or more design constraints;
generating a timing closure associated with at least one feature of the integrated circuit layout design based on the performance constraint analysis; and
determining that the timing closure violates at least one design rule,
wherein scanning the integrated circuit layout design for the problematic layout pattern is limited to the at least one feature of the integrated circuit layout design, and the at least one feature includes the at least one portion.

6. The method according to claim 5, further comprising:
executing a second performance constraint analysis based on the modified netlist and the one or more design constraints; and
generating a second timing closure associated with the at least one feature of the integrated circuit layout design based on the second performance constraint analysis.

7. The method according to claim 1, wherein the at least one performance characteristic includes a timing delay.

8. The method according to claim 7, wherein the timing delay relates to either a setup time delay, a hold time delay, or an aggregated delay combining one or more setup time delays with one or more hold time delays.

9. An apparatus comprising:
at least one processor; and
at least one memory including computer program code, the at least one memory and the computer program code configured to, with the at least one processor, cause the apparatus to perform at least the following:
receive data corresponding to a predetermined problematic layout pattern associated with at least one performance characteristic, the problematic layout pattern being one or more geometric elements,
receive data corresponding to an integrated circuit layout design,
scan the integrated circuit layout design for the one or more geometric elements of the problematic layout pattern,
identify at least one portion of the integrated circuit layout design substantially matching the problematic layout pattern, and
modify a netlist associated with the integrated circuit layout design based on the at least one performance characteristic.

10. An apparatus according to claim 9, wherein the apparatus is at least further caused to:
receive data corresponding to one or more design constraints associated with the at least one portion of the integrated circuit layout design;
execute a performance constraint analysis based on the modified netlist and the one or more design constraints; and
generate a timing closure associated with the at least one portion of the integrated circuit layout design based on the performance constraint analysis.

11. The apparatus according to claim 10, wherein the apparatus is at least further caused to:
extract one or more parasitic values associated with the at least one portion of the integrated circuit layout design; and
store the one or more parasitic values as the one or more design constraints.

12. The apparatus according to claim 10, wherein the one or more design constraints are specified by at least one designer of the integrated circuit layout design.

13. The apparatus according to claim 9, wherein the apparatus is at least further caused to:
receive data corresponding to one or more design constraints associated with the integrated circuit layout design;
execute a first performance constraint analysis based on the one or more design constraints;
generate a first timing closure associated with at least one feature of the integrated circuit layout design based on the performance constraint analysis; and
determine that the first timing closure violates at least one design rule,
wherein scanning the integrated circuit layout design for the problematic layout pattern is limited to the at least one feature of the integrated circuit layout design, and the at least one feature includes the at least one portion.

14. The apparatus according to claim 13, wherein the apparatus is at least further caused to:
execute a second performance constraint analysis based on the modified netlist and the one or more design constraints; and
generate a second timing closure associated with the at least one feature of the integrated circuit layout design based on the performance constraint analysis.

15. The apparatus according to claim 9, wherein the at least one performance characteristic includes a timing delay.

16. The apparatus according to claim 15, wherein the timing delay relates to either a setup time delay, a hold time delay, or an aggregated delay combining one or more setup time delays with one or more hold time delays.

17. A method comprising:
receiving, at least in part, data corresponding to a predetermined problematic layout pattern associated with at least one performance characteristic, the problematic layout pattern being one or more geometric elements, the problematic layout pattern being further associated with at least one manufacturing process;
receiving, at least in part, data corresponding to an integrated circuit layout design;
scanning the integrated circuit layout design for the one or more geometric elements of the problematic layout pattern;
identifying at least one portion of the integrated circuit layout design substantially matching the problematic layout pattern; and
modifying a netlist associated with the integrated circuit layout design based on the at least one performance characteristic,
wherein the at least one performance characteristic relates to either a setup time delay, a hold time delay, or an aggregated delay combining one or more setup time delays with one or more hold time delays, and
wherein at least one step of said method is executed by a processor.

18. The method according to claim 17, further comprising:
receiving, at least in part, data corresponding to one or more design constraints associated with the at least one portion of the integrated circuit layout design;
executing a performance constraint analysis based on the modified netlist and the one or more design constraints; and generating a timing closure associated with the at least one portion of the integrated circuit layout design based on the performance constraint analysis, wherein the one or more design constraints are either specified by at least one designer of the integrated circuit layout design or are extracted parasitic values associated with the at least one portion of the integrated circuit layout design.

19. The method according to claim 17, further comprising:

receiving, at least in part, data corresponding to one or more design constraints associated with the integrated circuit layout design;

executing a first performance constraint analysis based on the one or more design constraints;

generating a first timing closure associated with at least one feature of the integrated circuit layout design based on the performance constraint analysis; and determining that the first timing closure violates at least one design rule, wherein scanning the integrated circuit layout design for the problematic layout pattern is limited to the at least one feature of the integrated circuit layout design, and the at least one feature includes the at least one portion.

20. The method according to claim 19, further comprising:

executing a second performance constraint analysis based on the modified netlist and the one or more design constraints; and generating a second timing closure associated with the at least one feature of the integrated circuit layout design based on the performance constraint analysis.

* * * * *